United States Patent [19]

Platter et al.

[11] Patent Number: 5,155,639
[45] Date of Patent: Oct. 13, 1992

[54] TRANSPORT APPARATUS FOR A SINGLE REEL TAPE CARTRIDGE

[75] Inventors: Sanford Platter, Boulder; Robert T. Heath, Denver; Ron Permut, Louisville; William J. Rueger, Paonia, all of Colo.; Jeffrey M. Farina, Zionsville, Pa.; Gus Cotey, deceased, late of Pennsauken, N.J., by Harriet Cotey, Executrix; Arnold Schonfeld, Norristown, Pa.; Faquir C. Mittal, Audubon, Pa.; H. James Sheaffer, Plymouth Meeting, all of Pa.; Curtis V. Brooks, Lindenwold, N.J.

[73] Assignee: U.S. Philips Corporation, New York, N.Y.

[21] Appl. No.: 266,868

[22] Filed: Nov. 3, 1988

[51] Int. Cl.$^5$ ................ G11B 15/04; G11B 15/32
[52] U.S. Cl. ........................................ 360/95; 242/195
[58] Field of Search ............................ 360/95, 90, 93; 242/195, 197; 226/91, 92

[56] References Cited

U.S. PATENT DOCUMENTS

| | | | |
|---|---|---|---|
| 4,704,645 | 11/1987 | Murphy et al. | 360/93 |
| 4,805,045 | 2/1989 | Schonfeld et al. | 360/93 |
| 4,809,099 | 2/1989 | Murphy et al. | 360/95 |

OTHER PUBLICATIONS

Winarski et al., "Mechanical design of the cartridge and transport for the IBM 3480 Magnetic Tape Subsytem", IBM Journal of Research and Development, Nov. 1986, vol. 30, No. 6, pp. 635–644.

Primary Examiner—David J. Severin
Attorney, Agent, or Firm—David R. Treacy

[57] ABSTRACT

A tape transport which is sized to fit within an 8 inch form factor or footprint, to accommodate prevailing mini/micro computer applications, and including operative components which are capable of automatically receiving IBM Corporation's 3480-type tape cartridge and the web of tape which it contains for appropriate introduction to the transport for presentation to a high performance magnetic recording head. This permits a use of the 3480 tape cartridge in a transport apparatus which is capable of fitting within an 8 inch form factor or footprint, and which is therfore acceptable for use in connection with many mini/micro computer applications, yet which is capable of providing high performance (parallel track, high transfer rate) storage and retrieval due to its compatability (and interchangeability) with the format used by the IBM Corporation in connection with its 3480 tape cartridge.

139 Claims, 25 Drawing Sheets

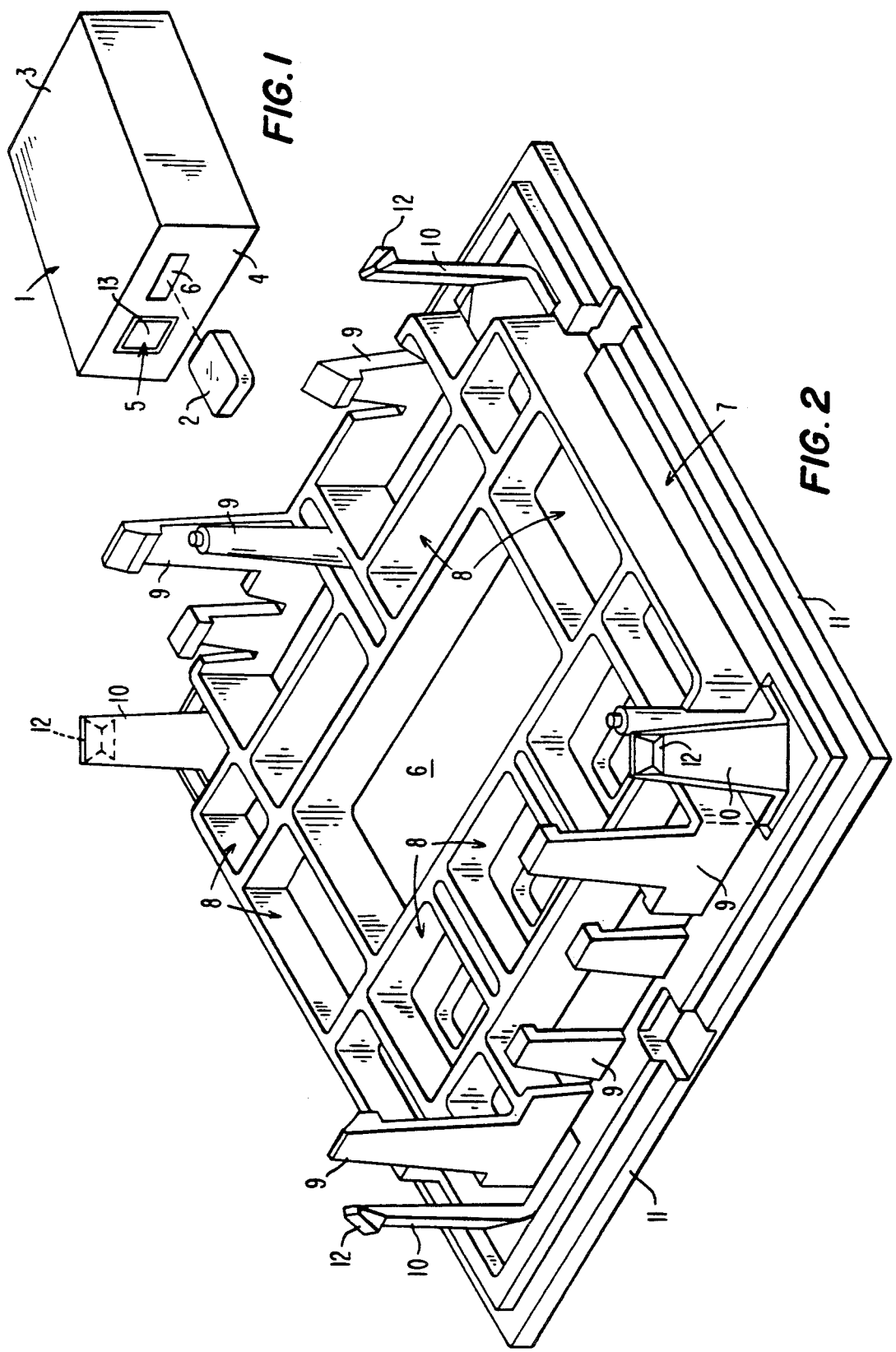

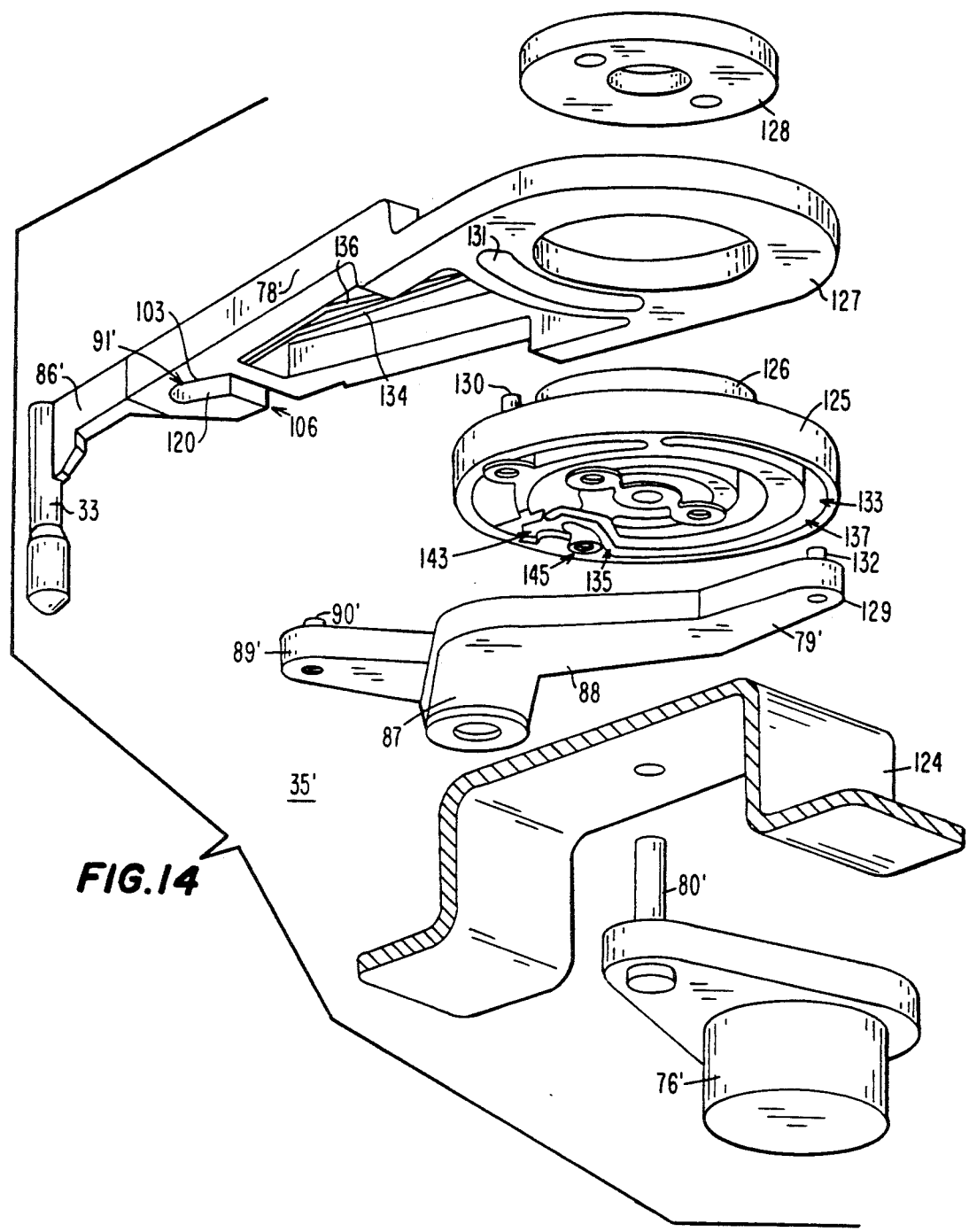

TRANSPORT APPARATUS FOR A SINGLE REEL TAPE CARTRIDGE

BACKGROUND OF THE INVENTION

The present invention relates generally to the storage of data on magnetic recording tape, and in particular, to the storage of data on magnetic tape in cartridge form.

In the course of developing various systems for the storage of data on magnetic recording tape, particularly off-line storage of data in the form of back-up storage, a variety of different formats have been developed. Many of these formats call for the tape to be contained in an appropriate cartridge, both to facilitate handling of the tape while in use, and to protect the tape while in storage.

To this end, the IBM Corporation has developed a tape cartridge which is primarily intended for use in its Model 3480 data storage system, for the storage of relatively large quantities of data (on the order of 200 megabytes). Details regarding the construction of this type of tape cartridge (hereinafter referred to as a 3480 tape cartridge) may be had with reference to U.S. Pat. No. 4,452,406. By way of general description, the 3480 tape cartridge is comprised of a single reel containing a quantity of magnetic tape and contained in a rectangular enclosure having dimensions on the order of 4 inches in width, 5 inches in length, and 1 inch in height. The cartridge enclosure includes an aperture in one of its major faces, to receive means for rotating the reel of tape contained within the cartridge, and an aperture in one of its corners, for gaining access to the free end of the web of tape. A so-called "leader block" is connected to the free end of the tape, and is retained within the open corner of the cartridge so that it is capable of being withdrawn from and replaced within the cartridge by appropriate means.

In connection with the 3480 tape cartridge, IBM Corporation has also developed equipment for receiving the tape cartridge and for properly placing the web of tape which it contains in operative association with a magnetic read/write head. Further details regarding such equipment may be had with reference to U.S. Pat. Nos. 4,432,508; 4,399,959; 4,399,936; and 4,335,858, which illustrate various different devices which have been developed by the IBM Corporation to accommodate its 3480 tape cartridge.

The 3480 tape cartridge has found wide acceptance in the industry, for a variety of reasons. One important reason for this is that unlike other types of tape cartridges which have been developed for use in the off-line storage of data, the IBM 3480 tape cartridge houses only a single reel of magnetic recording tape in a relatively small, space-efficient package. The resulting package is therefore conveniently stored and easily used.

To this end, the leader block which is connected to the free end of the web of tape is used to introduce the web of tape to the transport apparatus (and the read/write head). The transport apparatus must therefore be provided with appropriate means for withdrawing the leader block from its nesting within the 3480 tape cartridge, and for threading the leader block (and the web of tape) through the apparatus and past the read/write head. Of course, means must also be provided for unthreading the web of tape (and the leader block) from the apparatus, and for replacing the leader block within its nesting in the 3480 tape cartridge.

To this end, special means must be provided to engage the leader block assembly, and to guide the leader block (and the tape which follows) through the transport apparatus which is to operate upon the web of tape. This requires care in withdrawing the leader block from the tape cartridge, and in guiding the web of tape from the supply reel of the tape cartridge, past the read/write head, and into engagement with the take-up reel which is traditionally provided to cooperate with the supply reel in transporting the web of tape through the apparatus and past the read/write head. This necessitates the development of an appropriate path for threading the leader block through the apparatus, as well as means which have sufficient driving forces to withdraw the leader block from its normally seated position within the tape cartridge, and to replace the leader block within this normally seated position after the tape cartridge has been used. To meet these needs, as well as other design requirements regarding data density and performance characteristics, those devices described in the above-identified United States patents each make use of a leader block loading mechanism which is operated by a relatively large, dedicated driving motor, leading to significant demands for space and power, and overall cost.

Yet another consideration is that, as with any magnetic tape recording apparatus, care must be taken to develop a proper tape path between the supply and take-up reels, and across the read/write head, to assure proper registration of the tape with the read/write head. To this end, those devices described in the above-identified patents each provide a tape path of significant length, to account for such potential irregularities. Also to be considered in this regard is that care must be taken to avoid undesirable contact between the oxide coating provided on the web of magnetic recording tape and components such as bearings and idler rollers.

As a result of these and other design considerations, those devices which were originally developed to operate upon the 3480 tape cartridge were relatively large, cumbersome and expensive. While this was justifiable in connection with relatively large, mainframe computer applications, such design constraints tended to limit, and at times even preclude use of the 3480 tape cartridge in connection with lower cost, minicomputer or microcomputer applications. Yet another limiting factor was that of space. It was generally impractical, and therefore undesirable, to necessitate the purchase of an apparatus for off-line, back-up storage or the like which was significantly larger than the primary equipment which the apparatus was to support.

In fact, due to the prevalent use of both 8 inch and 5¼ inch magnetic recording (floppy) discs in connection with such applications, de facto standards arose for any form of storage equipment (floppy disc, hard disc, cartridge, etc.) which would replace or otherwise relate to such conventional storage means. The recognized "form factor" or "footprint" of a standard 8 inch magnetic recording disc calls for a container or housing having dimensions on the order of 8.5 inches in width, 15 inches in depth and 5 inches in height. The recognized "form factor" or "footprint" of a standard 5¼ inch magnetic recording disc calls for a container or housing having dimensions on the order of 5¾ inches in width, 8 inches in depth and 3¼ inches in height. Those devices described in the above-identified patents were not adaptable to such applications, limiting the ability to use the 3480 tape cartridge in mini/micro-computer applications.

Recognizing this, efforts were made to develop tape transports which were capable of operating upon a 3480 tape cartridge, and which were also capable of being contained within the reduced form factors or footprints required in connection with conventional mini/micro computer systems. One example of this is the "Patriot" tape transport which is manufactured by Computer Peripherals Inc., of Norristown, Pa., which incorporates a modified tape path adapted to provide all of the functions necessary to properly interface a 3480 tape cartridge with a tape transport, in a housing which is sufficiently small to accommodate a 5¼ form factor. However, this and other devices which have been developed for this purpose have generally required a compromise between the overall size of the transport, and its overall performance, particularly in terms of the data transfer rates which could be achieved in connection with such systems. Accordingly, while providing adequate results in connection with relatively low performance systems, it was found that this compromise tended to limit the utility of such transport devices for larger systems.

It therefore became desirable to develop a transport apparatus capable of accommodating the reduced form factors or footprints needed for conventional mini/micro computer applications, yet which could provide the higher performance characteristics which were necessary to satisfy the ever-expanding computer technology, and which was capable of operating upon data in the same format (parallel track, high transfer rate) as that used by the IBM Corporation in connection with its 3480 tape cartridge systems, to promote interchangeability with other systems.

SUMMARY OF THE INVENTION

It is therefore a primary object of the present invention to provide an apparatus for receiving and operating upon an IBM 3480 tape cartridge which is sufficiently compact for use in prevailing mini/micro computer applications, without an attendant attenuation in performance.

It is also an object of the present invention to provide such an apparatus with appropriate means for engaging the leader block of the tape cartridge, and for loading and unloading the magnetic recording tape which it contains without compromising the performance of the tape cartridge or the transport apparatus.

It is also an object of the present invention to provide such an apparatus with appropriate means for interfacing the web of magnetic recording tape with a high performance read/write head, using components capable of fitting within the reduced form factor or footprint which is available.

It is also an object of the present invention to provide such means in an apparatus which can operate upon data (read and write) in the same format as that used by the IBM Corporation in connection with its 3480 tape cartridge systems to promote system interchangeability.

It is also an object of the present invention to provide such means in an apparatus which is simple and reliable in operation, and which is cost effective even in connection with mini/micro computer applications.

These and other objects are achieved in accordance with the present invention by providing a tape transport which is sized to fit within a standard 8 inch form factor or footprint, to accommodate prevailing mini/micro computer applications, and which includes operative components capable of automatically receiving a 3480 tape cartridge and the web of tape which it contains for appropriate application to the transport for presentation to a high performance magnetic read/write head. This permits the use of a 3480 tape cartridge in a transport which is capable of fitting within the standard 8 inch form factor or footprint which is acceptable for use in connection with many mini/micro computer applications, and even certain super-mini and mainframe applications, yet which is capable of providing high performance data management.

To this end, a housing is provided which contains traditional supply and take-up drive mechanisms, coupled with improved means for receiving (loading and unloading) the 3480 tape cartridge and for accommodating (loading, unloading, guiding) the leader block of the 3480 tape cartridge and the web of tape which follows it, for appropriate presentation of the web of tape to a high performance magnetic read/write head. Leader block and tape handling are enhanced by a tape threading mechanism which incorporates a pair of pivotally interconnected arms which operate to transfer the leader block from the tape cartridge to the take-up reel in an efficient movement, utilizing a relatively small drive motor, and an improved take-up reel for properly receiving the leader block and the web of tape which follows it. Proper presentation of the web of tape to the magnetic read/write head is achieved by providing an improved tape guide assembly which spans the read/write head, coupled with an improved means for supplying compressed air to the guide assembly to properly retain the oxide coating on the web of tape away from the guiding surfaces without requiring an unduly large air supply system for this purpose. The result is a transport mechanism which is capable of fitting within the reduced 8 inch form factor or footprint which is acceptable for many mini/micro computer applications, and even certain super-mini and mainframe applications, yet which has the overall performance characteristics of the significantly larger transport mechanisms which have previously been used to operate upon the popular 3480 tape cartridge.

For further detail regarding a preferred embodiment tape transport in accordance with the present invention, reference is made to the detailed description which is provided below, taken in conjunction with the following illustrations.

BRIEF DESCRIPTION OF THE DRAWINGS

FIG. 1 is a perspective view of the tape transport of the present invention.

FIG. 2 is an enlarged, perspective view of the control panel housing of the tape transport of FIG. 1, shown from the rear of the operator's panel.

FIG. 14 is an exploded isometric view of an alternative embodiment leader block loading/unloading mechanism.

In the several views provided, like reference numerals denote similar structure.

DETAILED DESCRIPTION OF THE PREFERRED EMBODIMENT

Figure 3:
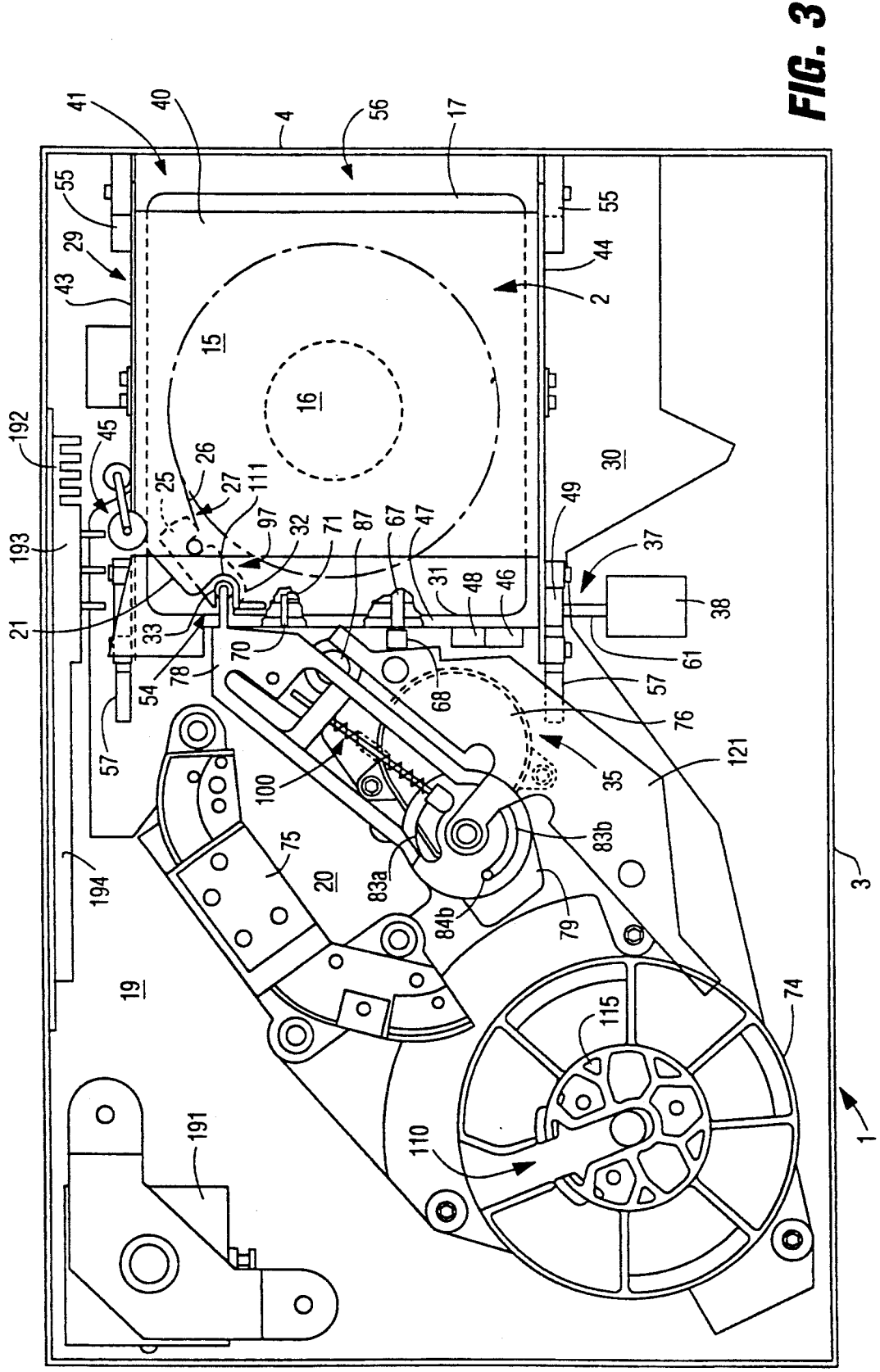
FIG. 3 is a top plan view of the tape transport of FIG. 1, with the cover removed to reveal internal construction detail.

FIG. 1 shows a transport 1 for receiving and operating upon an IBM 3480 tape cartridge 2 in accordance with the present invention. To be noted is that the transport 1 is sufficiently compact to be received within the confines of a standard 8 inch form factor or footprint.

The transport 1 generally comprises a housing 3 for containing the transport apparatus which serves to operate upon the tape cartridge 2 as will be more fully described below, and a bezel 4 having a control panel 5 for use by the operator of the transport 1 and a slot 6 for receiving the tape cartridge 2. As shown in FIG. 1, the slot 6 which receives the tape cartridge 2 is generally horizontally oriented within the bezel 4, with the control panel 5 to one side, and is appropriately sized to slidingly receive a tape cartridge 2 within the transport 1. However, other relative placements for the control panel 5 and the slot 6 are also possible, if desired. For certain applications, it may become desirable to place the transport 1 in a vertical orientation. While this can be accomplished in straightforward fashion by rotating the transport by 90 degrees, this also has the effect of placing the control panel 5 (particularly any indicia which it carries) at an improper orientation. To accommodate this, the control panel 5 is preferably adjustably attached to the bezel 4, as follows.

FIG. 2 shows a frame 7 which is used to develop the control panel 5. As illustrated, the frame 7 (shown from its rear) defines a series of cavities 8 for receiving switching and control devices associated with the transport 1, and a series of brackets 9, 10 extending from the frame 7 for mounting purposes. The brackets 9 are used to mount the various display, switching and control elements, and associated printed circuit boards, to the frame 7 as desired. The brackets 10 are used to secure the frame 7 (and accordingly the control panel 5) to the bezel 4. To be noted is that the brackets 10 are positioned at an angle (e.g., 45 degrees) to the edges 11 of the frame 7 so that the prongs 12 of the brackets 10 face the corners of the frame 7. In this manner, the mounting brackets 10 are positioned to engage mating corners of the bezel 4 in one of four orientations (corresponding to potential orientations for the transport 1). Thus, the orientation of the control panel 5 can be matched to the orientation of the transport 1 by withdrawing the frame 7 from the bezel 4, rotating the frame 7 as desired, and replacing the frame 7 (and accordingly the control panel 5) within the bezel 4 in its desired orientation. The control panel 5 (once adjusted) is then retained in its desired position by the brackets 10 of the frame 7 which engage the bezel 4 as previously described.

This arrangement not only allows the control panel 5 to be adjustably positioned within the bezel 4, but also permits removal of the control panel 5 from the transport 1 for remote operation of the unit (when provided with an appropriate extender cable or the like). In any event, the result is a compact unit which can conveniently house the control circuitry in close proximity to the associated controls. Suitable indicia (different legends, symbols, languages, etc.) are effectively applied to the frame 7 of the control panel 5 by fitting an indicia bearing template 13 to the frame 7 so that the template 13 is retained in place (e.g., by snapping the template into appropriate slots formed in the frame). Adjustment and servicing is therefore easily accomplished by snapping the various components of the control panel 5 together as previously described.

Figure 4:
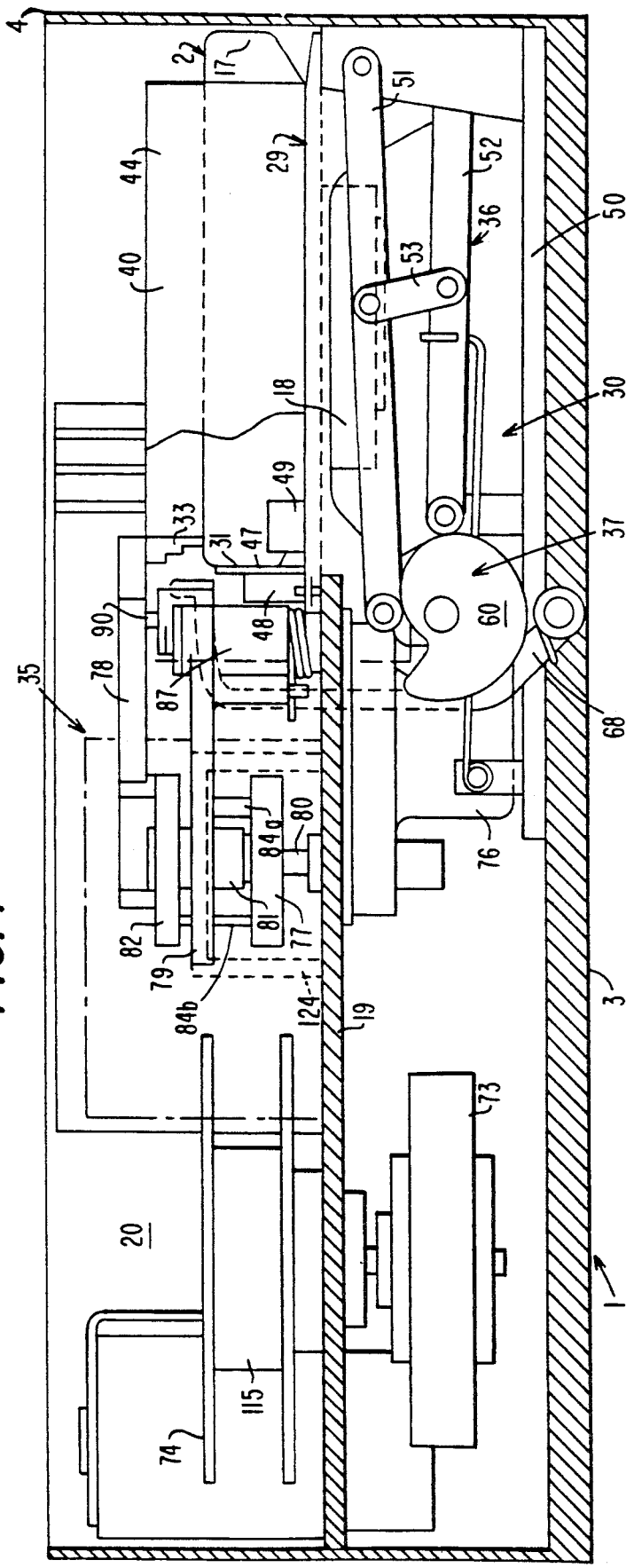
FIG. 4 is a side elevational view of the tape transport of FIG. 1, with the side panel deleted to reveal internal construction detail.

Referring now to FIGS. 3 and 4, the tape cartridge 2 generally comprises a quantity of tape 15 wound upon a supply reel 16 and contained within a housing 17. Suitable means (a geared coupling is conventionally provided for this purpose) are provided for placing the supply reel 16 in operative association with the corresponding geared, magnetic coupling of a supply motor 18 positioned beneath the surface 19 of the transport apparatus 20. A corner 21 of the housing 17 is open, and receives a leader block 25 which is used to securely engage the free end 26 of the web of tape 15 in conventional fashion. As produced by the manufacturer, the inwardly facing surface 27 of the web of tape 15 is provided with an oxide coating for recording purposes.

The tape cartridge 2 is received (through the slot 6 of the bezel 4) upon the loading rack 29 of a cartridge loading/unloading mechanism 30 with the leading edge 31 of the tape cartridge 2 facing inwardly toward the center of the transport apparatus 20. This operates to place the geared coupling of the supply reel 16 of the tape cartridge 2 in general registration with the corresponding coupling of the supply motor 18 of the transport apparatus 20, while simultaneously engaging a slot 32 which is conventionally provided in the leader block 25 of the tape cartridge 2 with a guide pin 33 which forms part of a leader block loading/unloading mechanism 35 which will be described more fully below. The tape cartridge 2 is initially received upon the loading rack 29 when in a stand-by position (see FIG. 5a), which permits the tape cartridge 2 to be inserted into and withdrawn from the transport 1 without interference with operative features of the transport apparatus 20. Thereafter, the loading rack 29 (and the tape cartridge 2) is lowered to an operative position (see FIG. 5b) in which the geared coupling of the supply reel 16 becomes firmly seated upon the corresponding coupling of the supply motor 18, and the leader block 25 becomes firmly seated upon the guide pin 33 of the leader block loading/unloading mechanism 35, readying the tape cartridge 2 for operation within the transport apparatus 20.

Figure 5A:
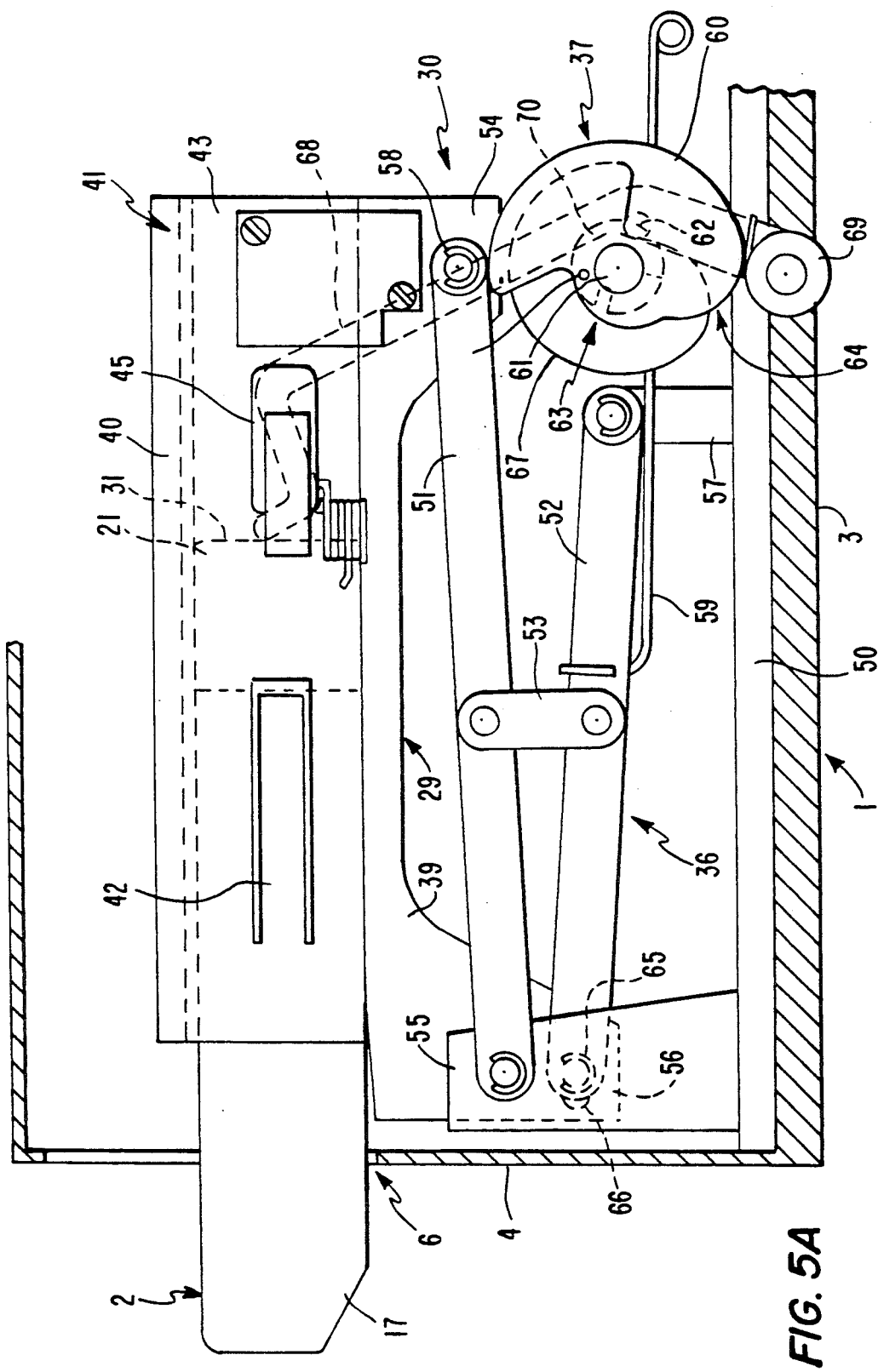
FIGS. 5a and 5b are enlarged, side elevational views of the cartridge loading/unloading mechanism in its raised and lowered positions, respectively.
Figure 5B:
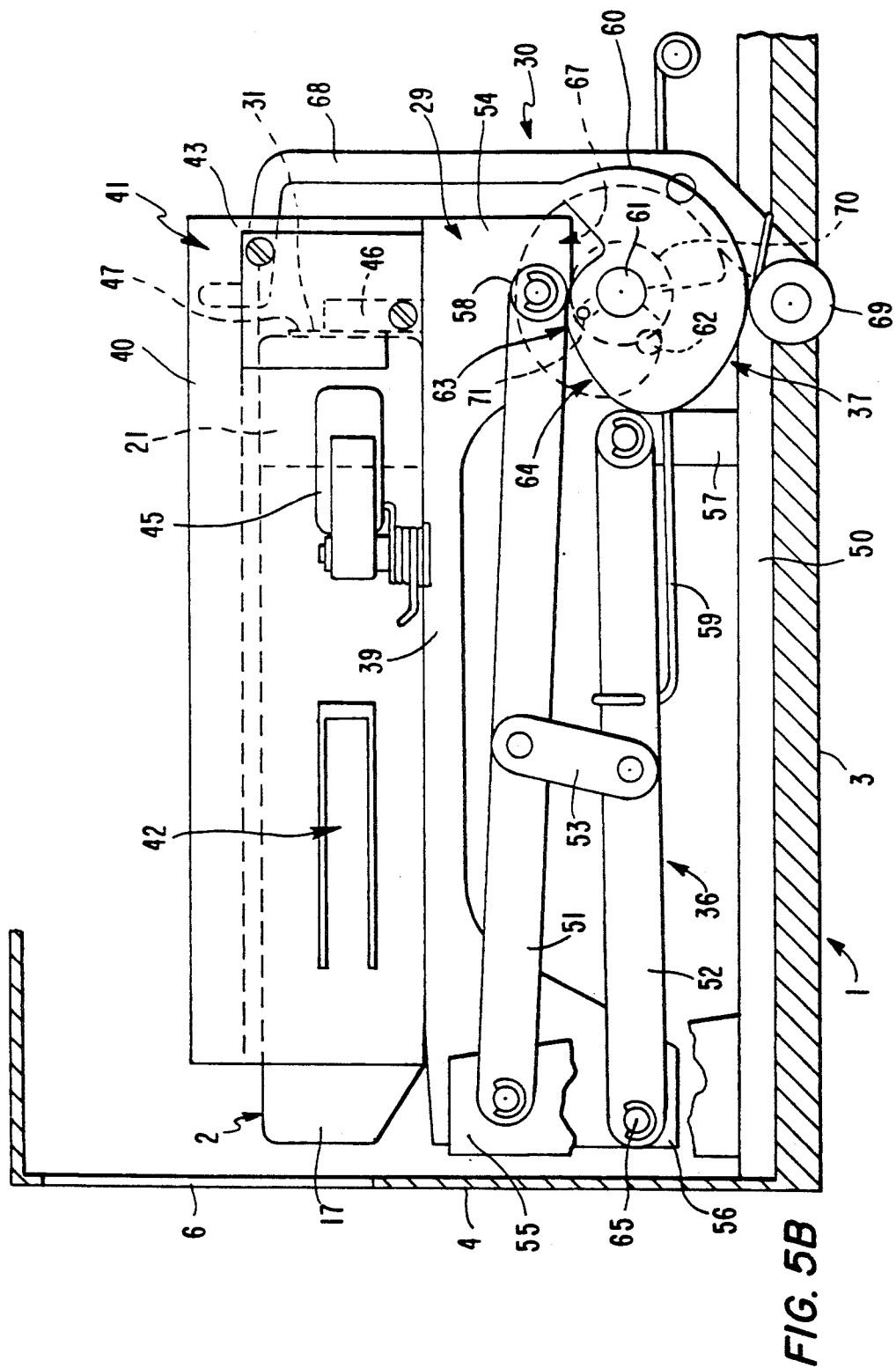

To this end, and referring now to FIGS. 5a and 5b, the cartridge loading/unloading mechanism 30 is generally comprised of the loading rack 29, for receiving the tape cartridge 2, a linkage 36 for moving the loading rack 29 relative to the transport apparatus 20, and a camming system 37 for regulating such movement responsive to an associated motor 38.

The loading rack 29 is generally defined by a supportive base 39 and a tray 40 which combine to develop a cavity 41 for slidingly receiving the tape cartridge 2. The tray 40 is additionally provided with various means for effectively receiving and interfacing with the tape cartridge 2, as follows.

A spring 42 is provided in a side 43 of the tray 40 to urge the received tape cartridge 2 against the opposite side 44 of the tray 40 to properly register the tape cartridge 2 within the cavity 41 of the loading rack 29. Also provided in the side 43 of the tray 40 is a spring-loaded guide block 45 for engaging the leader block 25 of the tape cartridge 2 to positively retain the leader block 25 against the tape cartridge 2 in the event that the leader block 25 is not firmly seated in the corner 21 which normally receives it. Thus, the spring 42 and the guide block 45 operate to place the features of the tape cartridge 2 in proper registration with the transport apparatus 20 so that these two structures will be properly mated following a cartridge loading operation.

A series of switches are further associated with the tray 40 of the loading rack 29 to advise the control circuitry of the transport 1 of the nature of the particular cartridge which has been introduced to the cartridge loading/unloading mechanism 30. A switch 46 extends from a flange 47 forming the innermost end of the cavity 41, and is used to detect the presence of a cartridge within the cavity 41 of the loading rack 29. The flange 47 of the loading rack 29 is additionally provided with a switch 48 which is used to determine whether or not the "write protection" feature of the tape cartridge 2 (which conventionally forms part of that cartridge) has been selected by the user. A switch 49 extends from the side 44 of the tray 40, and is positioned to detect whether the cartridge which has been inserted into the cavity 41 of the loading rack 29 is a tape cartridge 2 or a cleaning cartridge of the type adapted for use in connection with transports of the present type. The switches 46, 48, 49 are electrically coupled with appropriate control circuitry associated with the transport 1 to operate the transport 1 in accordance with the particular features which have been selected by the user (e.g., loading, either protected or unprotected, or cleaning).

The linkage 36 is generally comprised of three interconnected links 51, 52, 53 extending from opposite sides of the loading rack 29. The uppermost link 51 is pivotally connected between the innermost end 54 of the base 39 of the loading rack 29 and a pivot block 55 fixed to the mounting surface 50 which supports the cartridge loading/unloading mechanism 30 within the transport 1. The lower link 52 is pivotally connected between the forwardmost end 56 of the base 39 of the loading rack 29 and a pivot block 57 which is also fixed to the mounting surface 50. A center link 53 is pivotally connected between central portions of the upper link 51 and lower link 52, as shown. The links 51, 52, 53 are mutually interconnected so that a force applied to the pivot 58 which connects the upper link 51 to the loading rack 29 will operate to raise and lower the linkage 36, and the loading rack 29 which it supports, accordingly raising and lowering the tape cartridge 2 responsive to forces applied at the connection 58.

Loading springs 59 are positioned on opposite sides 43, 44 of the loading rack 29 to apply forces against the lower links 52 which operate to load the connections 58 against a pair of cams 60 associated with the camming system 37 and positioned on opposite sides 43, 44 of the loading rack 29. As a result of this, the loading rack 29 can be raised and lowered responsive to rotation of the cams 60 about a common drive shaft 61 responsive to rotation of the motor 38.

In operation; and as is best shown in FIG. 5a of the drawings, the loading rack 29 is normally maintained in a raised position to receive a tape cartridge 2 through the slot 6 in the bezel 4 of the transport 1. A tape cartridge 2 to be operated upon is inserted into the cavity 41 of the loading rack 29, through the slot 6, and is properly positioned within the cavity 41 under the influence of the retaining spring 42. The leader block is effectively supported in proper position by the guide block 45, irrespective of whether the leader block is fully seated within the corner 21 of the tape cartridge 2. The switches 48, 49 will determine the nature of the cartridge which has been inserted into the cavity 41 (e.g., write protected or for cleaning). The switch 46 will determine when the tape cartridge 2 has been fully inserted into the cavity 41 of the loading rack 29 and is in contact with the flange 47, signifying that the tape cartridge 2 is positioned for a cartridge loading operation to take place.

Cartridge loading then proceeds by causing the motor 38 to rotate the shaft 61 in a counter-clockwise direction, lowering the connections 58 and the linkage 36 under the influence of the loading springs 59. The cooperating links 51, 52, 53 will in turn operate to lower the loading rack 29 from its raised position toward the lowered position which is shown in FIG. 5b, which operates to firmly seat the leader block 25 (previously engaged by the guide pin 33 when the tape cartridge 2 was received within the cavity 41) upon the guide pin 33 of the leader block loading/unloading mechanism 35 and to bring the geared coupling of the supply reel 16 of the tape cartridge 2 into contact with the corresponding coupling of the supply motor 18. As the loading rack 29 approaches this lowered position, a pin 62 extending from each cam 60 is caused to contact the loading springs 59 to positively seat the loading rack 29 in its lowermost position (resting the tape cartridge 2 upon the seating pegs which are conventionally provided for this purpose), and to ready the tape cartridge 2 for subsequent operations.

Following desired operations upon the tape cartridge 2, a cartridge unloading procedure is then accomplished by reversing the cams 60, and accordingly, the movements of the loading rack 29 which were previously described. This is accomplished by reversing the direction of rotation of the motor 38, which causes the connections 58 to follow the cams 60, in turn raising the loading rack 29 to its uppermost position (FIG. 5a). Two features are particularly noteworthy in connection with this rotation of the cams 60.

First, the surface of each cam 60 is provided with a compound curvature comprised of a minor portion 63 and a major portion 64. The minor portion 63 of the cam 60 is configured to gradually raise the loading rack 29, while applying significant forces to each connection 58. This is done to provide the significant forces which are necessary to break the magnetic connection between the geared coupling of the supply reel 16 of the tape cartridge 2 and the corresponding coupling of the supply motor 18. Thereafter, the major portion 64 of the cam 60 is configured to more rapidly raise the loading rack 29 to its uppermost position, since significantly reduced forces are then required to do so.

Second, the pivot 65 which connects each lower link 52 to the forwardmost end 56 of the loading rack 29 is received within a slot 66 which is elongated in the general (substantially horizontal) direction of the lower link 52, so that the loading rack 29 will be caused to assume an angle in the course of being transferred from its lowermost position to its raised position. This angle serves to reduce the forces which are needed to separate the geared coupling of the supply reel 16 from the corresponding coupling of the supply motor 18, to further assist the minor portion 63 of the cam 60 in performing this function. To be noted is that the elongated slot 66 also tends to lower the loading rack 29 in similar, angled fashion, easing the placement of the geared coupling of the supply reel 16 upon the corresponding coupling of the supply motor 18 in the course of a cartridge loading operation.

Upon raising the loading rack 29 to its uppermost position, steps are taken to continue to rotate the cams 60 responsive to continued rotation of the motor 38, to perform a cartridge ejecting function as follows. An ejection cam 67 is additionally associated with the cam shaft 61, and cooperates with an ejection lever 68 which is loaded against the cam 67 by an appropriate spring 69. The cam 67 is configured so that continued rotation of the motor 38 will cause the ejection lever 68 to project from the flange 47 of the loading rack 29, as shown in phantom in FIG. 5a, pushing the tape cartridge 2 from the cavity 41 which receives it, and ejecting the tape cartridge 2 from the slot 6 in the bezel 4. Following this cartridge ejection procedure, steps are taken to reverse the motor 38 to its center position to ready the loading rack 29 to receive another tape cartridge 2. Controlled positioning of the cams 60, 67 is accomplished by a slotted disc 70 which is also associated with the cam shaft 61 and which cooperates with an appropriate detection device (e.g., a photocell or magnetic sensor) to determine the positioning of the cams 60, 67, and accordingly, to regulate the above-described cartridge loading and unloading procedures.

Following a cartridge loading procedure as previously described, it becomes necessary to withdraw the leader block 25 from the corner 21 of the housing 17 for transfer through the transport apparatus 20, past a magnetic read/write head 75 and to a take-up reel 74. The take-up reel 74 is received upon a take-up motor 73 located beneath the surface 19 of the transport apparatus 20, permitting the web of tape 15 to be transported between the supply reel 16 and the take-up reel 74 responsive to rotation of the supply motor 18 and the take-up motor 73, transporting the web of tape 15 past the read/write head 75 to achieve desired transfers of data.

As previously indicated, a primary object of the present invention is to provide a tape transport 1 which is capable of assuming an 8 inch form factor, yet which is capable of providing performance characteristics often associated with larger transport mechanisms. This enhanced performance is primarily the result of an enhanced tape path which is achieved in accordance with the present invention as will be described more fully below, to permit the use of a parallel, 18 track magnetic read/write head according to the thirteenth draft of the proposed ANSI X3B5 Standard for magnetic tape cartridges of the general type being addressed herein, i.e., the IBM 3480 tape cartridge.

The use of such a tape cartridge in a high-performance, parallel-track-formatted transport capable of assuming an 8 inch form factor or footprint was previously not possible because of the precision necessary to effectively transport a web of magnetic recording tape past such a read/write head configuration, generally due to limitations in the tape paths which were previously developed for such purposes. However, use of such a read/write head in a transport apparatus capable of assuming an 8 inch form factor or footprint is now permitted by providing the transport apparatus 20 with certain improvements, as follows.

Figure 6:
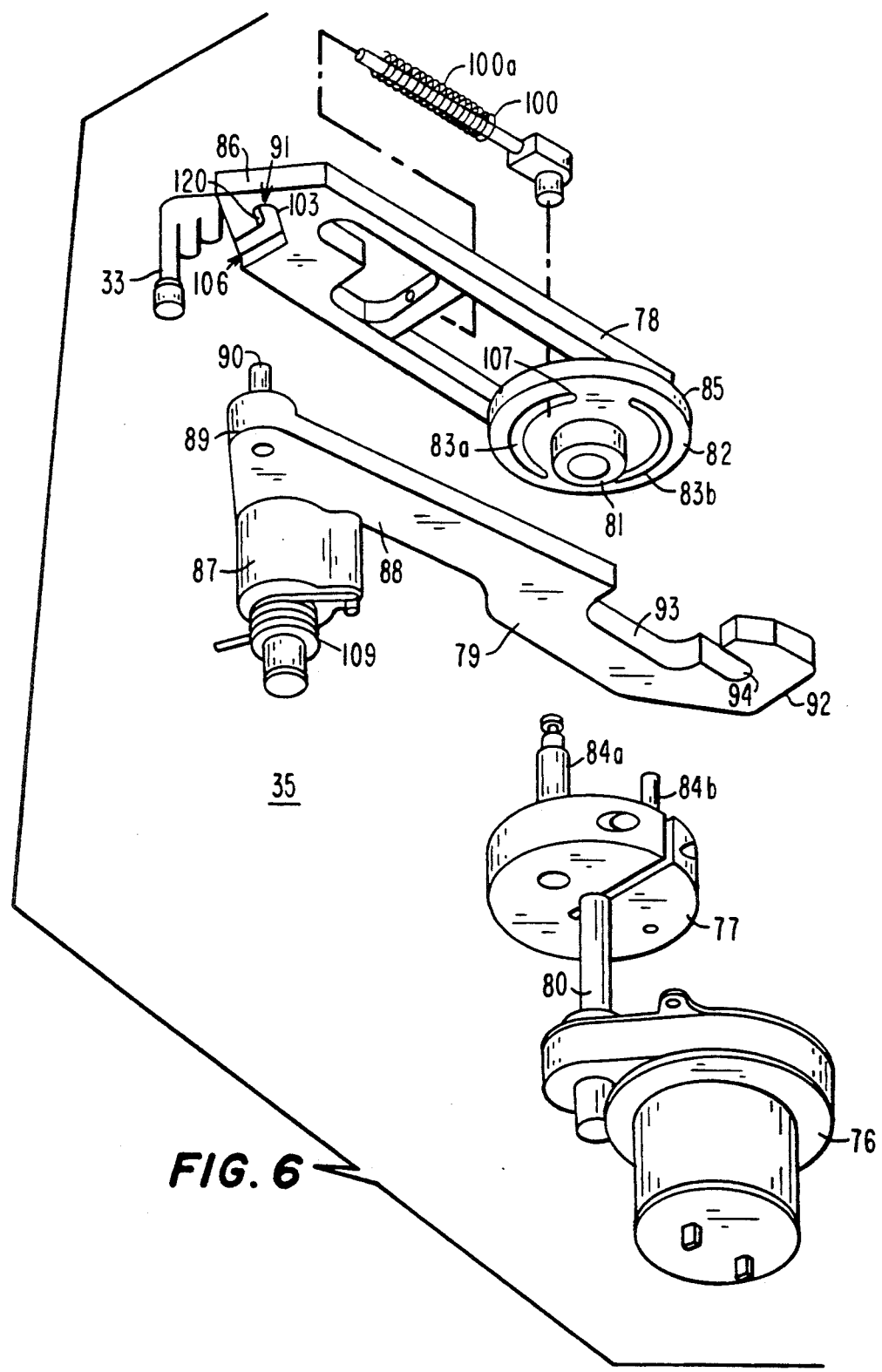
FIG. 6 is an exploded isometric view of the leader block loading/unloading mechanism.

FIG. 6 shows components of a leader block loading-/unloading mechanism 35 which is used to transfer the leader block 25 from the tape cartridge 2 to the take-up reel 74 as previously described. Torque for operating the leader block loading/unloading mechanism 35 is provided by a motor 76 which receives a drive coupling 77 and which in turn engages paired arms 78, 79. The motor 76 is mounted beneath the surface 19 of the transport apparatus 20 so that its shaft 80 extends through the surface 19 of the transport apparatus 20 and into fixed engagement with the drive coupling 77, which lies above the surface 19.

The shaft 80 of the motor 76 also slidingly receives a bearing 81 in the uppermost arm 78, enabling the arm 78 to freely rotate about an axis defined by the center-line of the shaft 80 (the shaft 80 is further received by an upper support 121 which is attached to the surface 19 of the transport 1 and which includes a bearing 122 which operates to capture the upper arm 78 between the lower arm 79 and the upper support 121). Surrounding the bearing 81 is a flange 82 which is provided with a pair of slots 83a, 83b for slidingly receiving a pair of driving pins 84a, 84b which extend from the coupling 77, to deliver driving forces to the upper arm 78 as will be described more fully below. The flange 82 is associated with a first end 85 of the arm 78, the opposite end 86 of which is provided with the guide pin 33 which is used to engage the slot 32 provided in the leader block 25 as previously described.

The lowermost arm 79 is positioned just beneath the upper arm 78, and is received by the surface 19 of the transport apparatus 20 at a pivot 87 which extends from inboard portions 88 of the lower arm 79. One end 89 of the lower arm 79 is provided with a pin 90 which projects from the lower arm 79 into a configured slot 91 provided in the underside of the upper arm 78. The other end 92 of the lower arm 79 is provided with a detent 93 for avoiding contact with the bearing 81 of the upper arm 78, and a longitudinally extending slot 94 for receiving one of the driving pins 84b of the drive coupling 77.

The leader block loading/unloading mechanism 35 shown in FIG. 6 generally operates to transfer the leader block 25 from the tape cartridge 2 to the take-up reel 74 as follows. The upper arm 78 serves as the primary means for accomplishing this transfer, by drawing the leader block 25 through the transport apparatus 20 responsive to movement of the guide pin 33 which is provided at its end 86. The motive forces which are needed for this transfer are delivered to the upper arm 78 through an operative connection which is developed between the end 107 of the slot 83a in the flange 82 and the driving pin 84a of the coupling 77 which engages it. In transferring a leader block 25 from the tape cartridge 2 to the take-up reel 74, and in returning the leader block 25 from the take-up reel 74 to the tape cartridge 2, little energy and therefore relatively small forces are necessary during predominant portions of the resulting transfer path (shown as 95 in FIG. 7 of the drawings). However, there are two exceptions to this which must be accounted for.

One portion of the leader block transfer path 95 in which significantly increased forces are required is to positively withdraw the leader block 25 from its nesting 97 within the corner 21 of the tape cartridge 2, as well as to replace the leader block 25 within this nesting 97 prior to removal of the tape cartridge 2 from the transport 1. To provide the increased motive forces which are necessary, without necessitating an increase in the size of the motor 76 (which can otherwise be kept relatively small), the lower arm 79 is configured to assist in both the withdrawal of the leader block 25 from the tape cartridge 2, as well as its replacement within the tape cartridge 2, by imparting a levering action to the resulting assembly. This is generally accomplished by rotating the driving pin 84b within the slot 94 of the lower arm 79, rotating the lower arm 79 about the pivot 87. This in turn develops a lever which operates to amplify the forces which are produced at the drive pin 90, "snapping" the leader block from its nesting 97 during a tape threading operation, and "snapping" the leader block back into its nesting 97 following a leader block unloading procedure.

The other portion of the leader block transfer path 95 in which properly directed forces are required involves unloading of the leader block 25 from the take-up reel 74, to positively unseat the leader block 25. The forces which are necessary to accomplish this are provided by the pre-load spring 100a of a spring-pin clutch 100 which is pivotally connected between the upper arm 78 and the drive pin 84a, and which serves to apply sufficient forces to the leader block 25 to withdraw the leader block 25 from the take-up reel 74 in the course of a leader block unloading procedure.

Further detail regarding each of these operations is provided below, with reference to FIGS. 7 to 11 and 13, which illustrate a typical leader block loading/unloading procedure.

Figure 7:
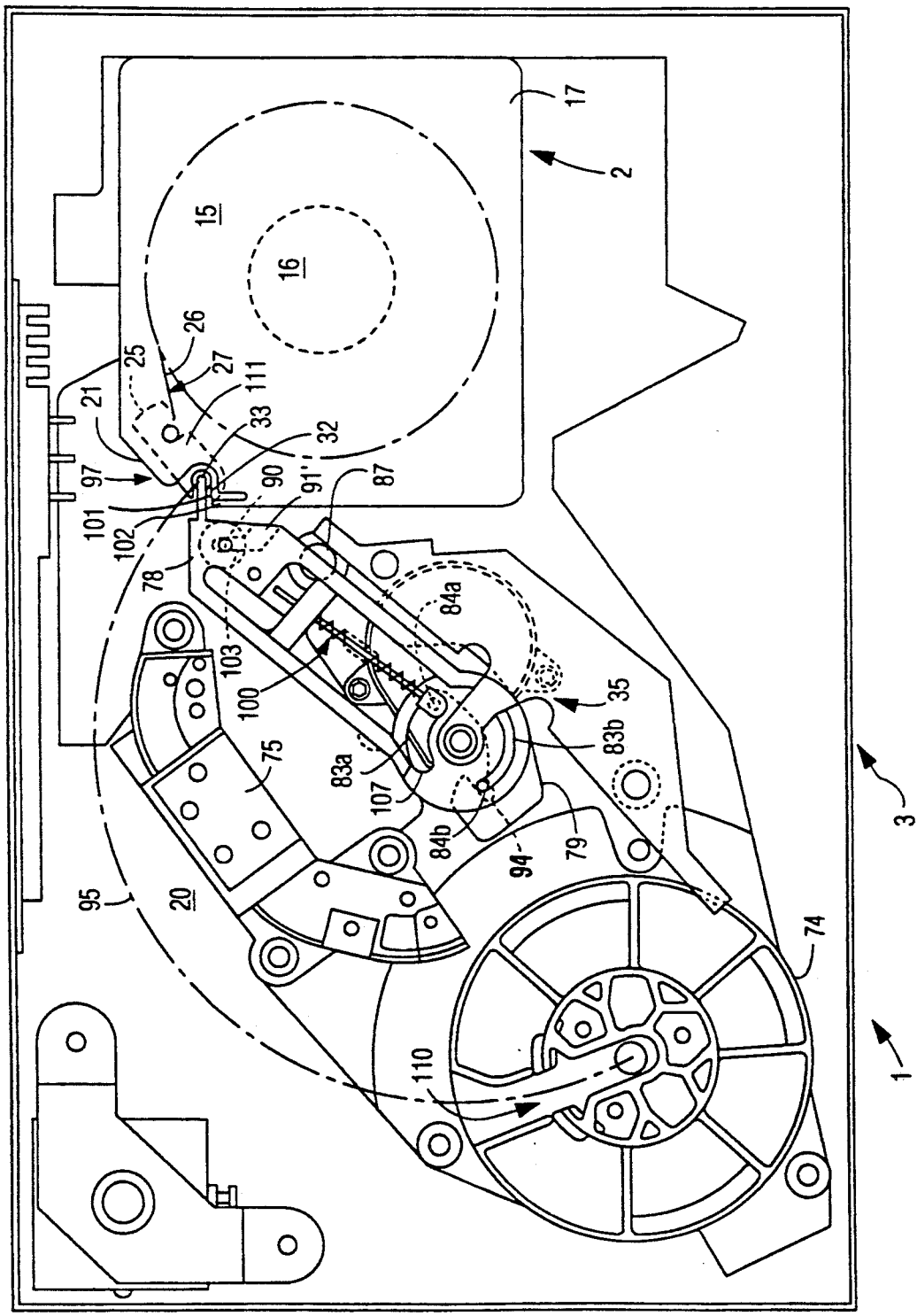
FIGS. 7 to 11 are top plan views which sequentially show the manner in which the leader block loading/unloading mechanism of FIG. 6 operates to transfer a leader block from the tape cartridge to the take-up reel of the transport apparatus.

FIG. 7 illustrates a transport 1 having a tape cartridge 2 seated within its cartridge loading rack 29, and ready (loading rack 29 lowered) for a leader block loading operation (structural detail of the remainder of the cartridge loading/unloading mechanism 30 has been deleted for illustrative purposes only). It will be understood that resulting from such placement, the guide pin 33 of the leader block loading/unloading mechanism 35 will be seated within the slot 32 of the leader block 25, ready for a leader block loading procedure to commence, but that the leader block 25 will be nested in the corner 21 of the tape cartridge 2 so that the tip 101 of the leader block 25 is retained behind a flange 102 in the cartridge housing 17, securing the leader block 25 in its stored position.

As previously indicated, the amount of force required to snap the leader block 25 from its nesting 97, by causing the tip 101 of the leader block 25 to pass the flange 102 of the housing 17, will generally be significantly more than that which the motor 76 is capable of providing to the upper arm 78 of the leader block loading/unloading mechanism 35 (to permit the use of a motor 76 which is reduced in size for reasons previously described). However, the lower arm 79 is available for this purpose, as follows.

Rotation of the coupling 77 causes the driving pins 84a, 84b to advance in a counter-clockwise direction within the slots 83a, 83b of the upper arm 78. As a result of this, the driving pin 84b applies a motive force to the slot 94 of the lower arm 79, causing the pin 90 of the arm 79 to rotate (also counter-clockwise but on a much smaller radius) about the pivot 87. This in turn forces the pin 90 of the lower arm 79 against the sloping edge 103 of the slot 91 provided in the upper arm 78, urging the end 86 of the upper arm 78 away from the tape cartridge 2. The resulting mechanical advantage operates to amplify the forces produced at the drive pin 90 (in effect amplifying the forces produced by the motor 76), which are then sufficient to cause the tip 101 of the leader block 25 to pass the flange 102 of the housing 17, releasing the leader block 25 from the tape cartridge 2. To be noted is that during this operation, and so that the appropriate mechanical advantage can be developed, the coupling 77 and the driving pins 84a, 84b will be caused to proceed through an angle of rotation which is larger than that which is appropriate for the upper arm 78. This is accommodated by the slots 83a, 83b and the spring-pin clutch 100, which combine to effectively decouple the upper arm 78 from the driving pins 84a, 84b while the drive pin 90 is acting upon the upper arm 78 as previously described.

Figure 8:
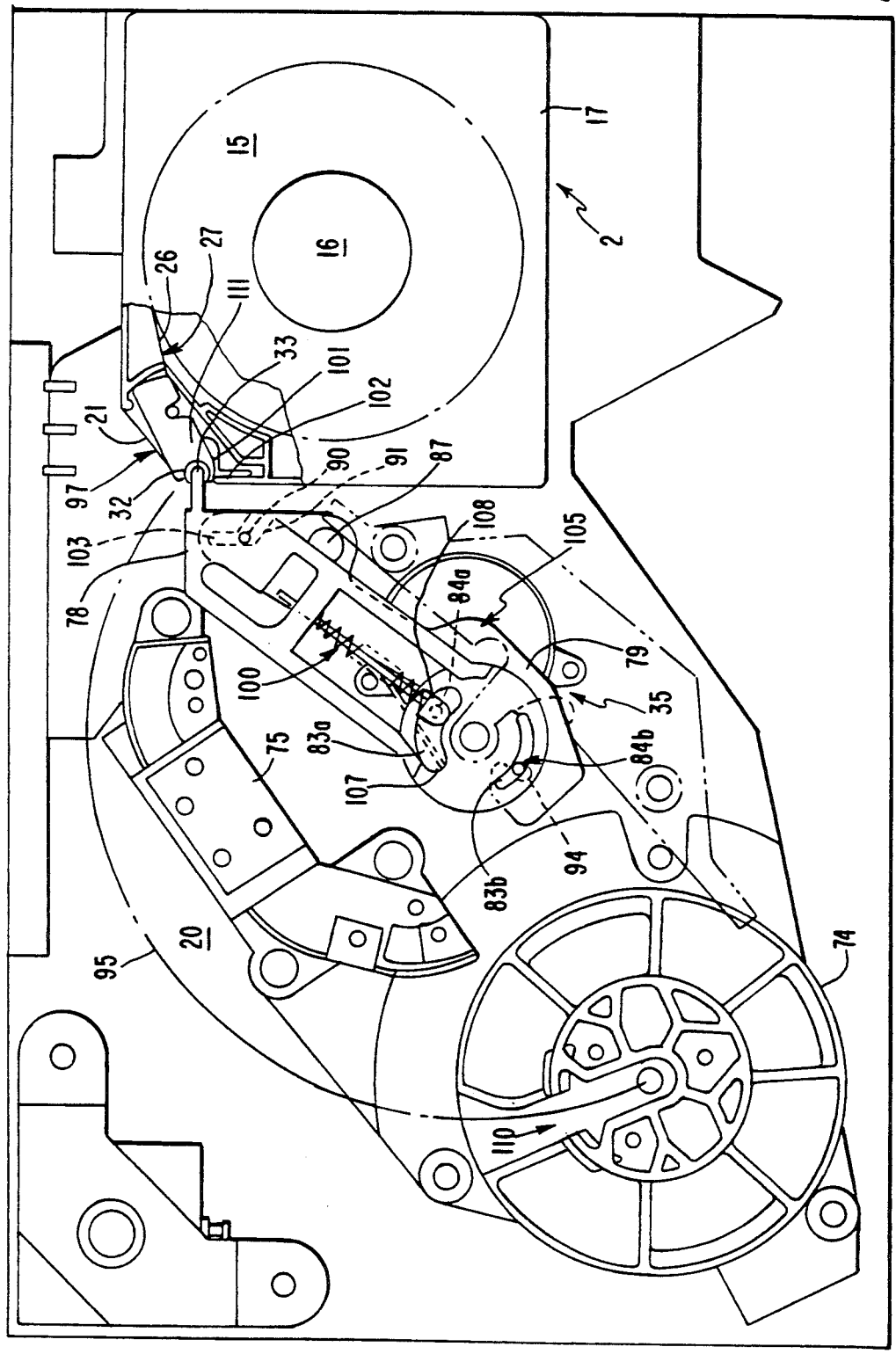
Figure 9:
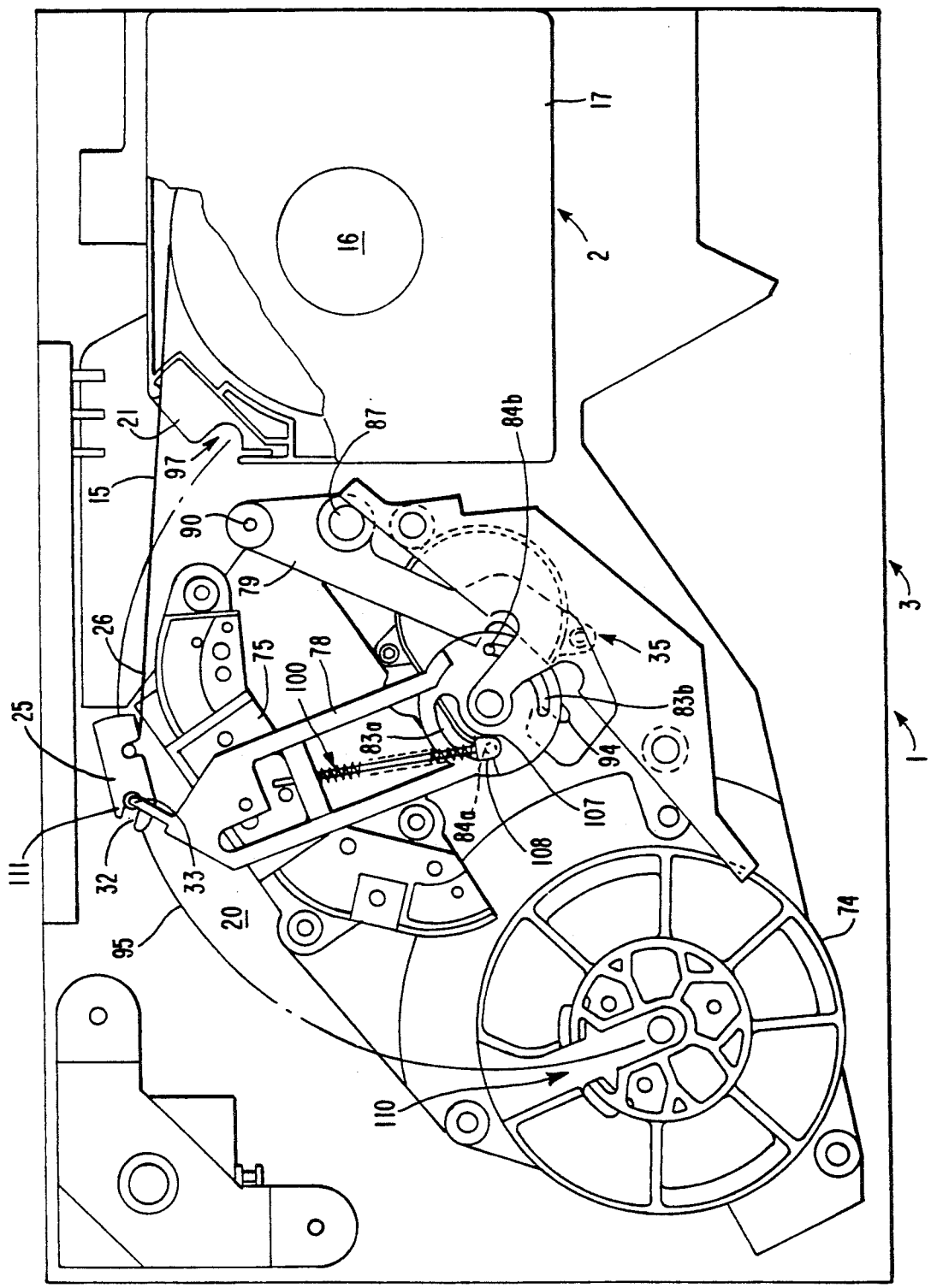
Figure 10:
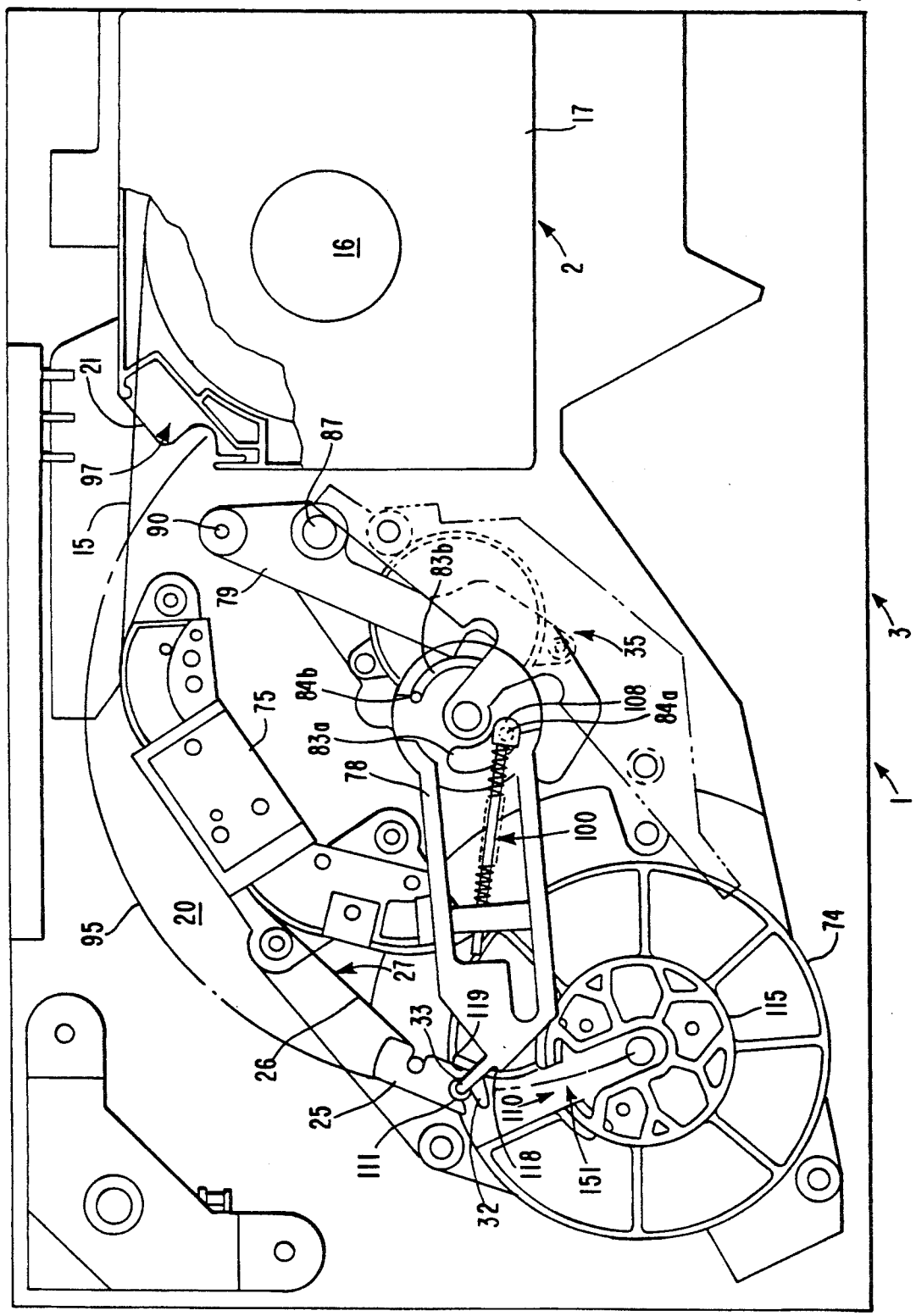
Figure 11:
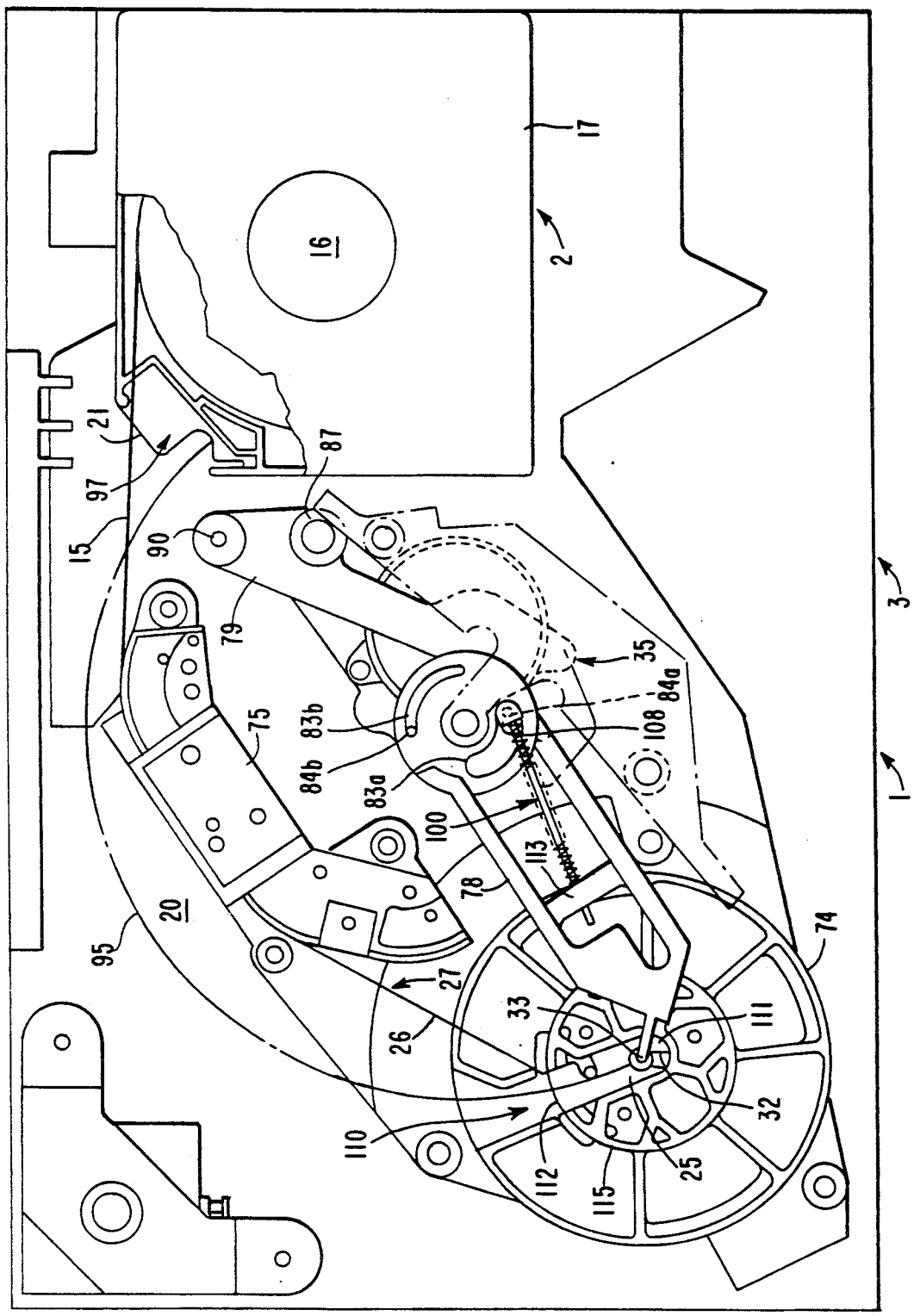

Such counter-clockwise movement of the coupling 77 causes the lower arm 79 to rotate to the position 105 which is shown in FIG. 8. This permits the driving pin 84b to pass from the slot 94 in the lower arm 79, and continue its counter-clockwise rotation. What is more, in the course of this rotation (which is only on the order of 15 degrees of movement of the coupling 77), the pin 90 is caused to move along the slot 91 of the upper arm 78, until the pin 90 comes into general alignment with an opening 106 provided in the slot 91 which extends laterally to the exterior of the upper arm 78. This motion serves to disconnect the upper arm 78 from the lower arm 79 so that the upper arm 78 is then free to rotate (beyond the limited movement of the lower arm 79) in a counter-clockwise direction resulting from contact between the driving pin 84a of the coupling 77 and the end 107 of the slot 83a in the upper arm 78 (to reduce potential timing problems, the slot 83b is preferably elongated relative to the slot 83a so that rotation of the upper arm 78 results only from contact between the driving pin 84a and the slot 83a). To be noted is that the spring-pin clutch 100 operates to maintain the proper orientation of the slot 91 in the upper arm 78 relative to the pin 90 in the lower arm 79 during this transfer in control of the upper arm 78 from the drive pin 90 to the driving pin 84a, resulting from the pre-load of the spring 100a which is connected between the end 108 of the spring-pin clutch 100 and the pivot block 113 of the upper arm 78. A spring 109 (see FIG. 6) is provided to retain the disengaged lower arm 79 in this position, for subsequent engagement during return of the leader block 25 to the tape cartridge 2 as will be described more fully below.

The arm 78 is then caused to proceed through an arcuate transfer path 95 (referring to FIG. 9) extending from the corner 21 of the tape cartridge 2 to the take-up reel 74, under the influence of the motor 76. To be noted is that the motor 76 is fully sufficient to provide the relatively small torque which is necessary to accomplish this latter transfer.

As is conventional, the take-up reel 74 includes a nest 110 which is configured to slidingly receive the leader block 25 and complete the periphery of the hub 115 of the take-up reel 74. To prepare the take-up reel 74 to receive the leader block 25, steps are taken to properly orient the nest 110 (using techniques which are otherwise known) so that continued counter-clockwise rotation of the upper arm 78 will bring the engaged end 111 of the leader block 25 to the nest 110 of the take-up reel 74 (referring to FIG. 10 of the drawings), eventually causing the end 111 to enter the nest 110. This continues until such time as the leader block 25 is caused to fully seat within the nest 110 (referring to FIG. 11 of the drawings), so that the trailing end 112 of the leader block 25 is in general alignment with (and therefore completes) the periphery of the hub 115 of the take-up reel 74.

Figure 12:
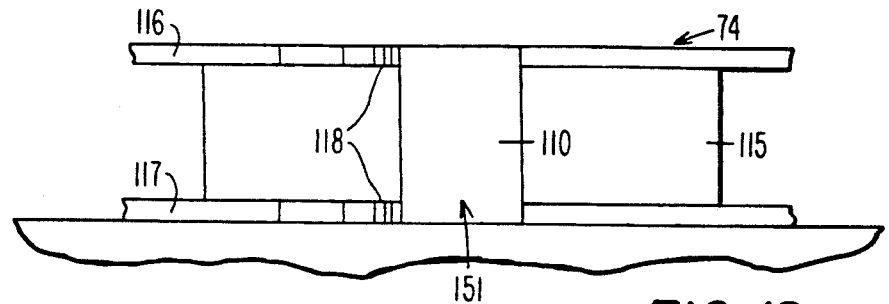
FIG. 12 is a partial, side elevation view of the take-up reel, and the nest of the hub which receives the leader block.

It has been found that the orientation of the leader block 25 which results from the relationship between the engaged slot 32 of the leader block 25 and the web of tape 15 which extends from the leader block 25, is not ideally suited to entry of the nest 110 as the leader block 25 approaches the take-up reel 74. For this reason, and with reference to FIG. 12 of the drawings, the flanges 116, 117 of the take-up reel 74 are provided with correspondingly configured tracks 118 which operate to initially receive the leader block 25 and to thereafter guide the leader block 25 into the nest 110. This is accomplished by causing the side edge 119 of the leader block 25 to pass along the tracks 118 (see FIG. 10), in turn causing the leader block 25 to rotate from its initial position, as received prior to entering the nest 110, to a position (generally radial) which is appropriate for proper entry into the nest 110. To be noted is that this is accomplished without requiring additional guides or other structures to properly insert the leader block 25 into its nesting, at 110. Also to be noted is that the opposed tracks 118 are enlarged in relation to the distance between the flanges 116, 117 to assist passage of the leader block 25 into the nest 110 while assuring that the web of tape 15 which follows is properly received between the flanges 116, 117 during subsequent tape transport (to reduce tape pack slippage).

This, in turn, serves to complete the leader block loading operation, readying the transport apparatus 20 for further data processing. It is preferred that during such operations, contact between the guide pin 33 and the slot 32 of the leader block 25 should be kept to a minimum, if not avoided, and it is therefore preferred to provide a relatively wide tolerance between the guide pin 33 and the slot 32 to avoid contact between these components when the leader block 25 remains seated within the nest 110.

This continues until such time as the transfer of data which is desired is completed, and a leader block unloading operation is to take place. This is initiated by rotating the coupling 77 in a clockwise direction, causing the driving pin 84a to apply a compressive force to the end 108 of the spring-pin clutch 100. Resulting from this, a reactive force is applied by the opposite end of the spring-pin clutch 100 to the pivot block 113 on the upper arm 78. This force causes the upper arm 78 to rotate in a clockwise direction, withdrawing the leader block 25 from the nest 110 and causing the leader block to progress toward the tape cartridge 2, along the transfer path 95, responsive to continued clockwise rotation of the upper arm 78. To be noted is that the tracks 118 also operate to facilitate a controlled withdrawal of the leader block 25 from the hub 115 of the take-up reel 74 by properly orienting the leader block 25 for eventual return to the tape cartridge 2.

Figure 13:
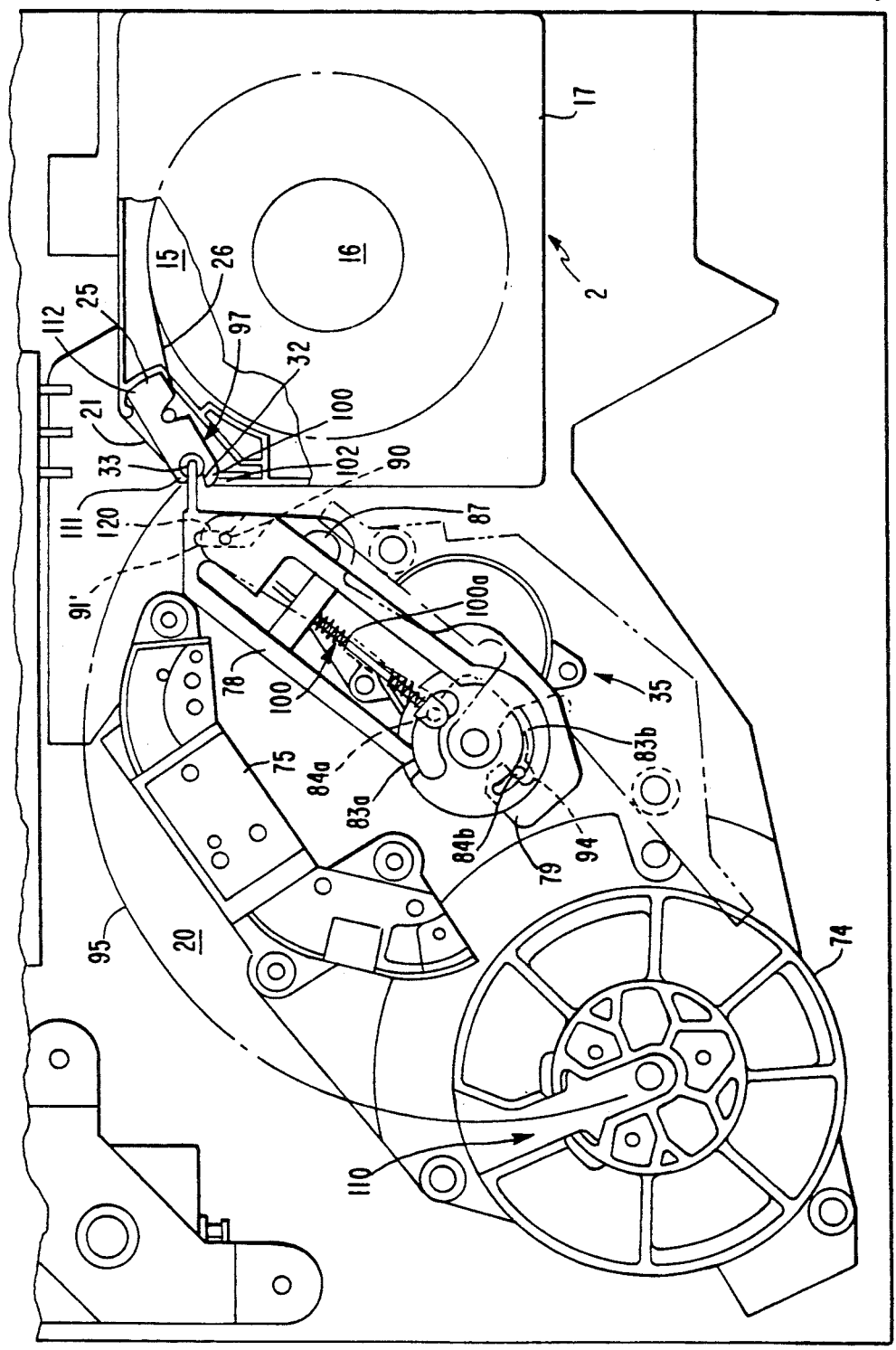
FIG. 13 is a top plan view similar to those of FIGS. 7 to 11, showing operation of the leader block loading-/unloading mechanism to replace the leader block within the tape cartridge.

Referring to FIG. 13 of the drawings, this will continue until such time as the leader block 25 is positioned just outside of the corner 21 of the housing 17, and is ready for reinsertion into its nesting 97. In the course of reaching this position, the opening 106 in the slot 91 of the upper arm 78 will engage the pin 90 of the lower arm 79, and the pin 84b of the coupling 77 will engage the slot 94 of the lower arm 79. To be noted is that the spring-pin clutch 100 and the spring 109 operate to correctly position the upper arm 78 relative to the lower arm 79 in the course of this transfer. This will in turn cause the lower arm 79 to rotate in a generally clockwise orientation with respect to the pivot 87, in turn causing the pin 90 to engage the sloping edge 120 of the slot 91. The resulting levering action again operates to provide sufficient force to cause the tip 101 of the leader block 25 to pass the flange 102 of the housing 17, returning the leader block to its seated position within the tape cartridge 2. The tape cartridge 2 is then ready for ejection from the transport 1, as previously described.

FIG. 14 shows an alternative embodiment leader block loading/unloading mechanism 35' which may be used to transfer the leader block 25 from the tape cartridge 2 to the take-up reel 74. Torque for operating the leader block loading/unloading mechanism 35' is again provided by a motor 76'. However, in this case the motor 76' is mounted to a raised portion 124 of the surface 19 of the transport apparatus 20, as shown in phantom in FIG. 4 of the drawings, which places the support for the motor 76' within the curve of the lower arm 79' and in close proximity to the upper arm 78' of the alternative embodiment leader block loading/unloading mechanism 35'. This has been found to be particularly beneficial in reducing the cantilevered length of the shaft 80' of the motor 76', eliminating the need for the upper support 121 which is used to properly support the leader block loading/unloading mechanism 35.

The shaft 80' of the motor 76' engages a coupling 125. The top of the coupling 125 defines a bearing 126 for receiving a first end 127 of the upper arm 78' so that the upper arm 78' is free to rotate between the top of the coupling 125 and a finishing cap 128, and about an axis defined by the center-line of the shaft 80' (and the coupling 125). The opposite end 86' of the upper arm 78' again includes the guide pin 33 for engaging the leader block 25 of the tape cartridge 2. To be noted is that the bearing 126 develops a broad support area for receiving the end 127 of the upper arm 78′, so that the upper arm 78′ is less subject to drooping or play due to wear. Also extending from the top of the coupling 125 is a driving pin 130, which is received by a slot 131 formed in the end 127 of the upper arm 78′ to deliver driving forces to the upper arm 78′ as will be described more fully below.

The lower arm 79′ is again positioned just beneath the upper arm 78′, and is pivotally associated with the surface 19 of the transport apparatus 20, at 87. The end 89′ of the lower arm 79′ is again provided with a pin 90′ which projects from the lower arm 79′ into a configured slot 91′ provided in the underside of the upper arm 78′. However, the other end 129 of the lower arm 79′ is now fitted with a follower 132 for engaging a camming track 133 formed in the bottom of the coupling 125. To be noted is that this arrangement operates to remove the lower arm 79′ from between the upper arm 78′ and the coupling 125, which permits the supporting portion 124 of the surface 19 to be raised closer to the coupling 125, and which in turn allows the cantilevered length of the shaft 80′ to be reduced as previously described.

The leader block loading/unloading mechanism 35′ shown in FIG. 14 generally operates to transfer the leader block 25 from the tape cartridge 2 to the take-up reel 74 as follows. The upper arm 78′ again serves as the primary means for accomplishing this transfer, by drawing the leader block 25 through the transport apparatus 20 responsive to movement of the guide pin 33. The motive forces which are needed for this transfer are delivered to the upper arm 78′ through the operative connection which is developed between a pair of springs 134, 136 associated with the upper ar 78′ and the driving pin 130 of the coupling 125 which engages them. As before, in transferring a leader block 25 from the tape cartridge 2 to the take-up reel 74, and in returning the leader block 25 from the take-up reel 74 to the tape cartridge 2, little energy and therefore relatively small forces are necessary during predominant portions of the resulting transfer path (shown as 95′ in FIG. 15 of the drawings). However, the following two exceptions must again be accounted for.

To provide the increased motive forces which are required to positively withdraw the leader block 25 from its nesting 97 within the corner 21 of the tape cartridge 2, as well as to replace the leader block 25 within this nesting 97 prior to removal of the tape cartridge 2 from the transport 1, without necessitating an increase in the size of the motor 76′, the lower arm 79′ again operates to assist in both the withdrawal of the leader block 25 from the tape cartridge 2, as well as its replacement within the tape cartridge 2, by imparting a levering action to the resulting assembly. This is generally accomplished by rotating the coupling 125 so that the track 133 will act upon the follower 132 which extends from the lower arm 79′, rotating the lower arm 79′ about the pivot 87. This again develops a lever which operates to amplify the forces which are produced at the drive pin 90′, "snapping" the leader block from its nesting 97 during a tape threading operation, and "snapping" the leader block back into its nesting 97 following a leader block unloading procedure.

The other portion of the leader block transfer path 95′ in which properly directed forces are again required is to assure proper unloading of the leader block 25 from the take-up reel 74, to positively unseat the leader block 25. The forces which are necessary to accomplish this are provided by a leaf spring 134 associated with the upper arm 78′, which serves to apply sufficient forces to the leader block 25 to withdraw the leader block 25 from the take-up reel 74 when this becomes necessary.

Further detail regarding these operations is provided below with reference to FIGS. 15 to 19, which illustrate a typical leader block loading/unloading procedure.

Figure 15:
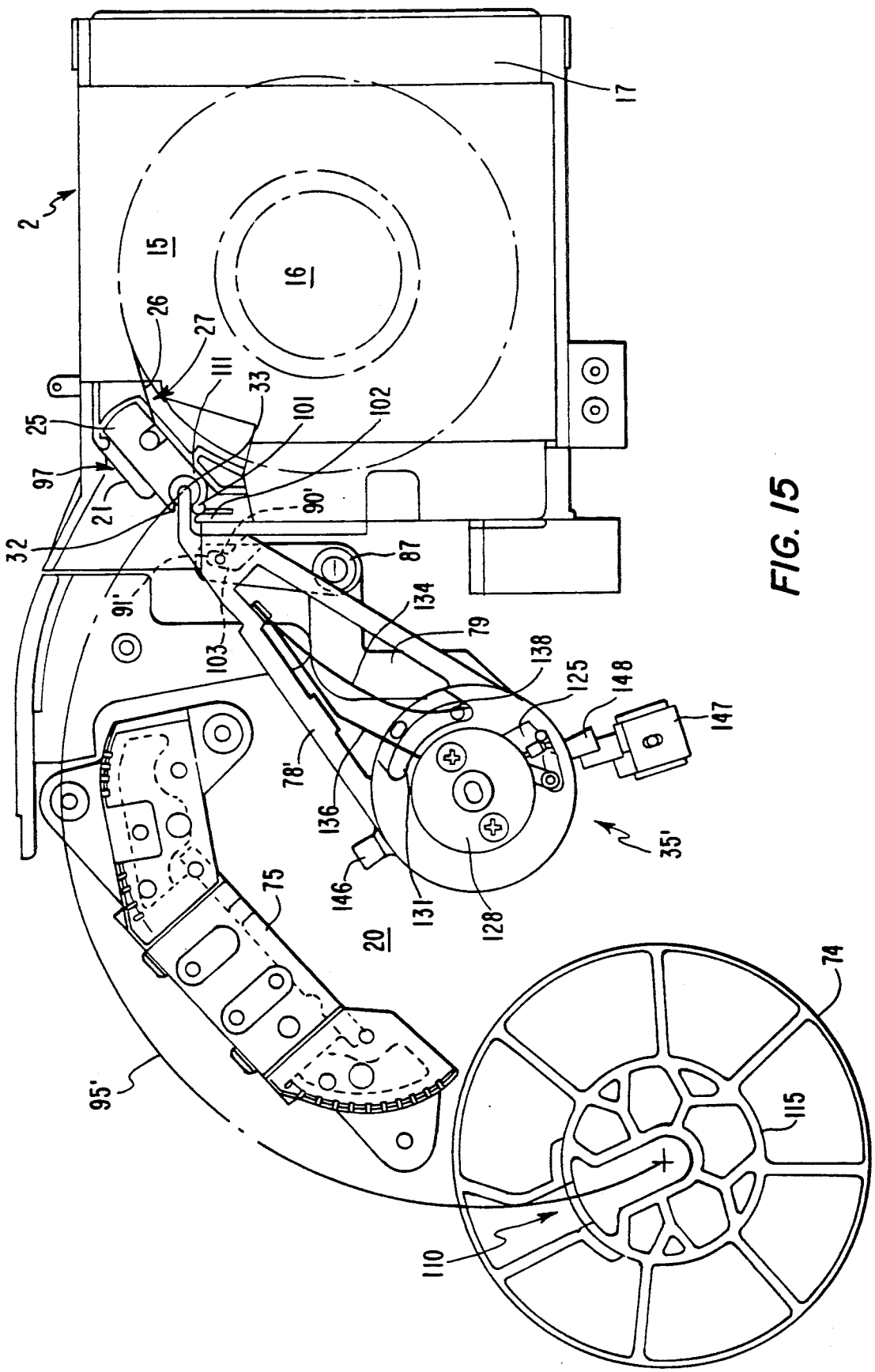
FIGS. 15 to 18 are top plan views which sequentially show the manner in which the alternative embodiment leader block loading/unloading mechanism of FIG. 14 operates to transfer a leader block from the tape cartridge to the take-up reel.

FIG. 15 illustrates a transport 1 having a tape cartridge 2 seated in the cartridge loading rack 29, and ready (loading rack 29 lowered) for a leader block loading operation (further detail regarding the cartridge loading/unloading mechanism 30 is again deleted for purposes of illustration). As before, the amount of force required to snap the leader block 25 from its nesting 97 will significantly exceed the amount of energy which the motor 76′ is capable of providing to the upper arm 78′ of the leader block loading/unloading mechanism 35′. However, the lower arm 79′ is again available for this purpose, as follows.

Figure 14A:
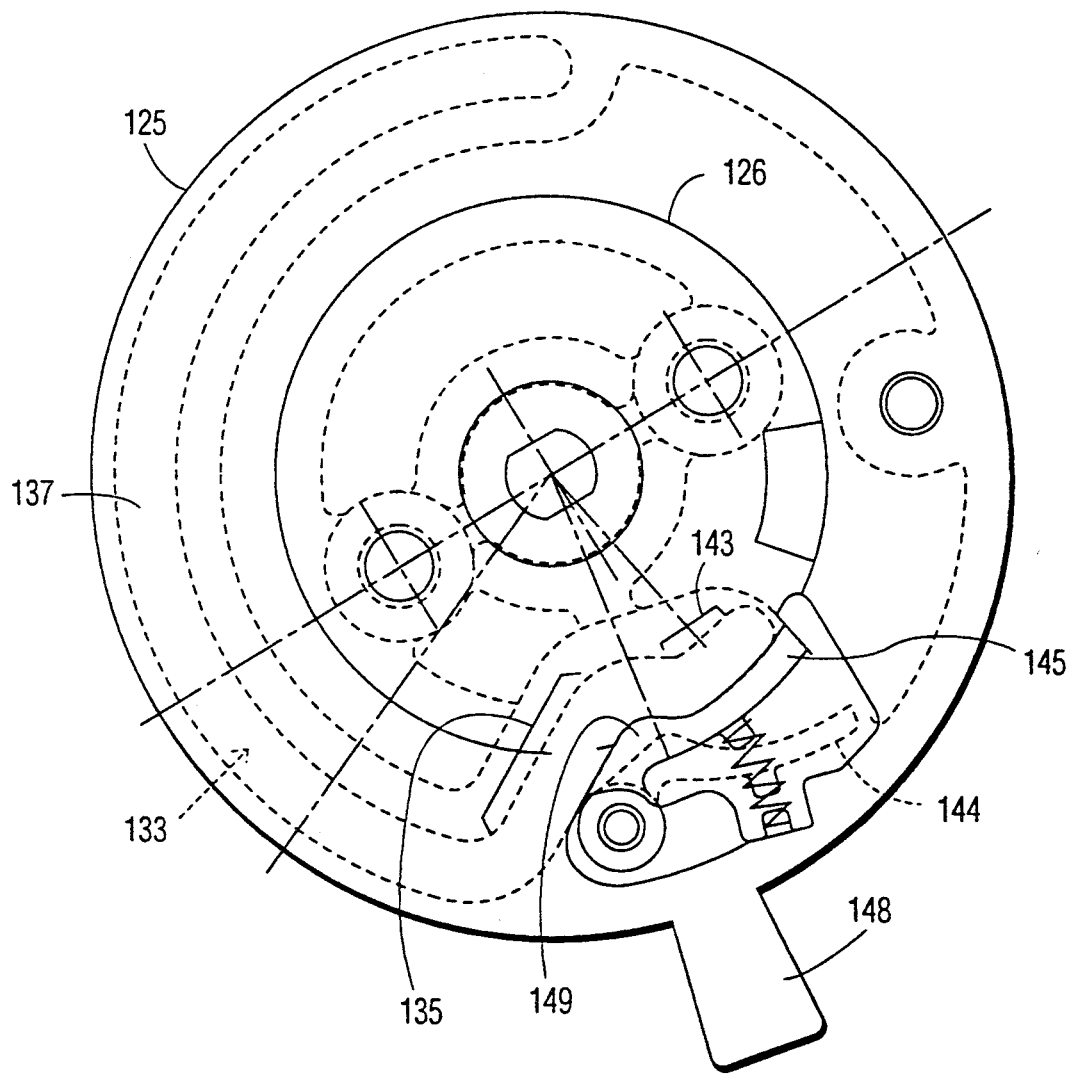
FIG. 14a is a bottom plan view of the drive coupling of the alternative embodiment leader block loading/unloading mechanism of FIG. 14.

Rotation of the coupling 125 in a counter-clockwise direction causes the follower 132 to progress along the configured portion 135 of the track 133 which is shown in FIG. 14a, in turn causing the lower arm 79′ to rotate the drive pin 90′ (also counter-clockwise but on a much smaller radius) about the pivot 87. This operates to force the pin 90′ of the lower arm 79′ against the edge of the slot 91′ provided in the upper arm 78′, urging the end 86′ of the upper arm 78′ away from the tape cartridge 2. The resulting mechanical advantage operates to amplify the forces produced at the drive pin 90′ (accordingly amplifying the forces produced by the motor 76′), which are then sufficient to cause the tip 101 of the leader block 25 to pass the flange 102 of the housing 17, releasing the leader block 25 from the tape cartridge 2. During this operation, the coupling 125 and the driving pin 130 will be caused to proceed through an angle of rotation which is larger than that which is appropriate for the upper arm 78′, again so that the appropriate mechanical advantage can be developed. This is accommodated by the slot 131 formed in the upper arm 78′, which operates to effectively decouple the upper arm 78′ from the driving pin 130 while the drive pin 90′ is acting upon the upper arm 78′.

Figure 16:
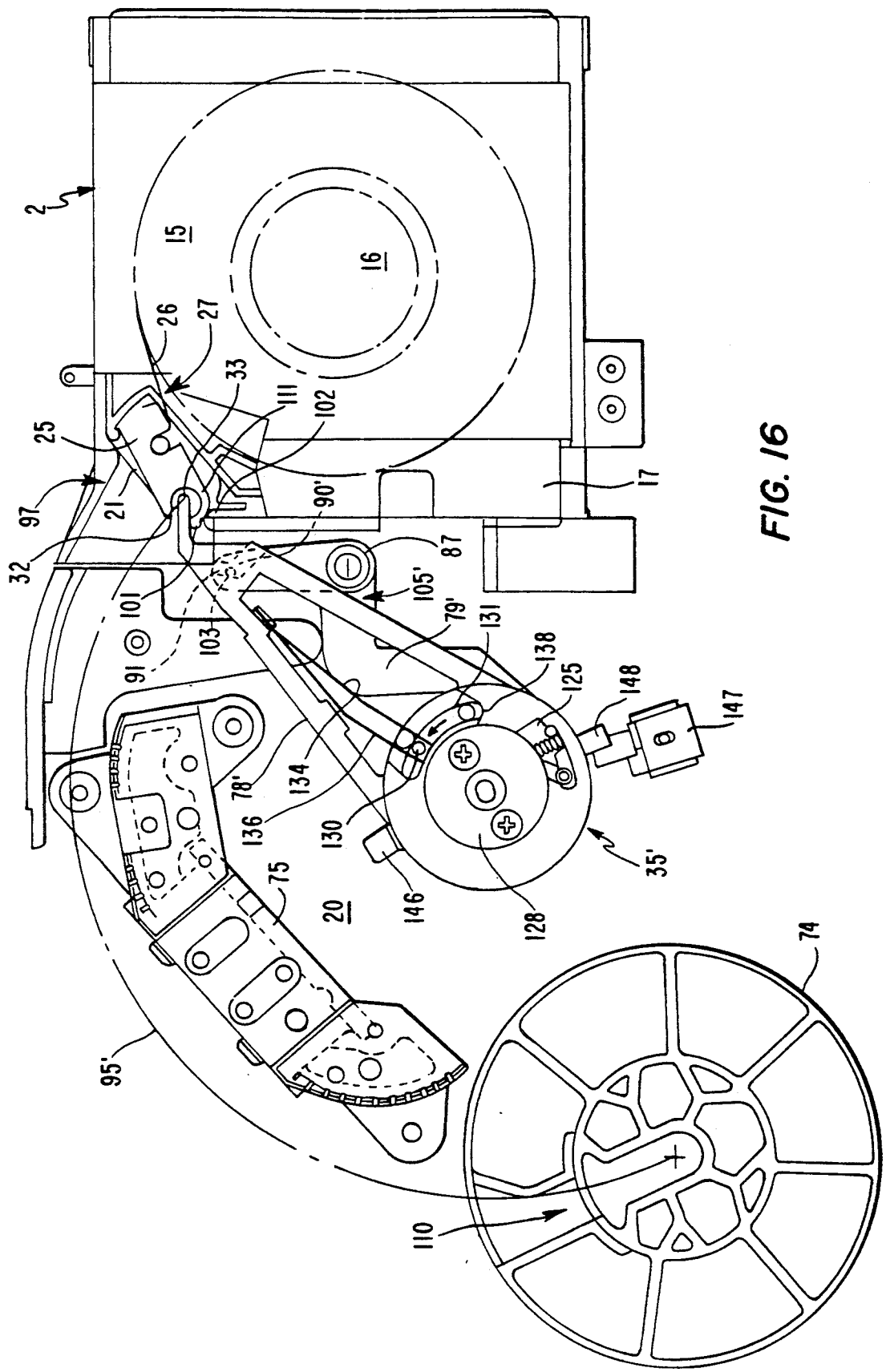
Figure 17:
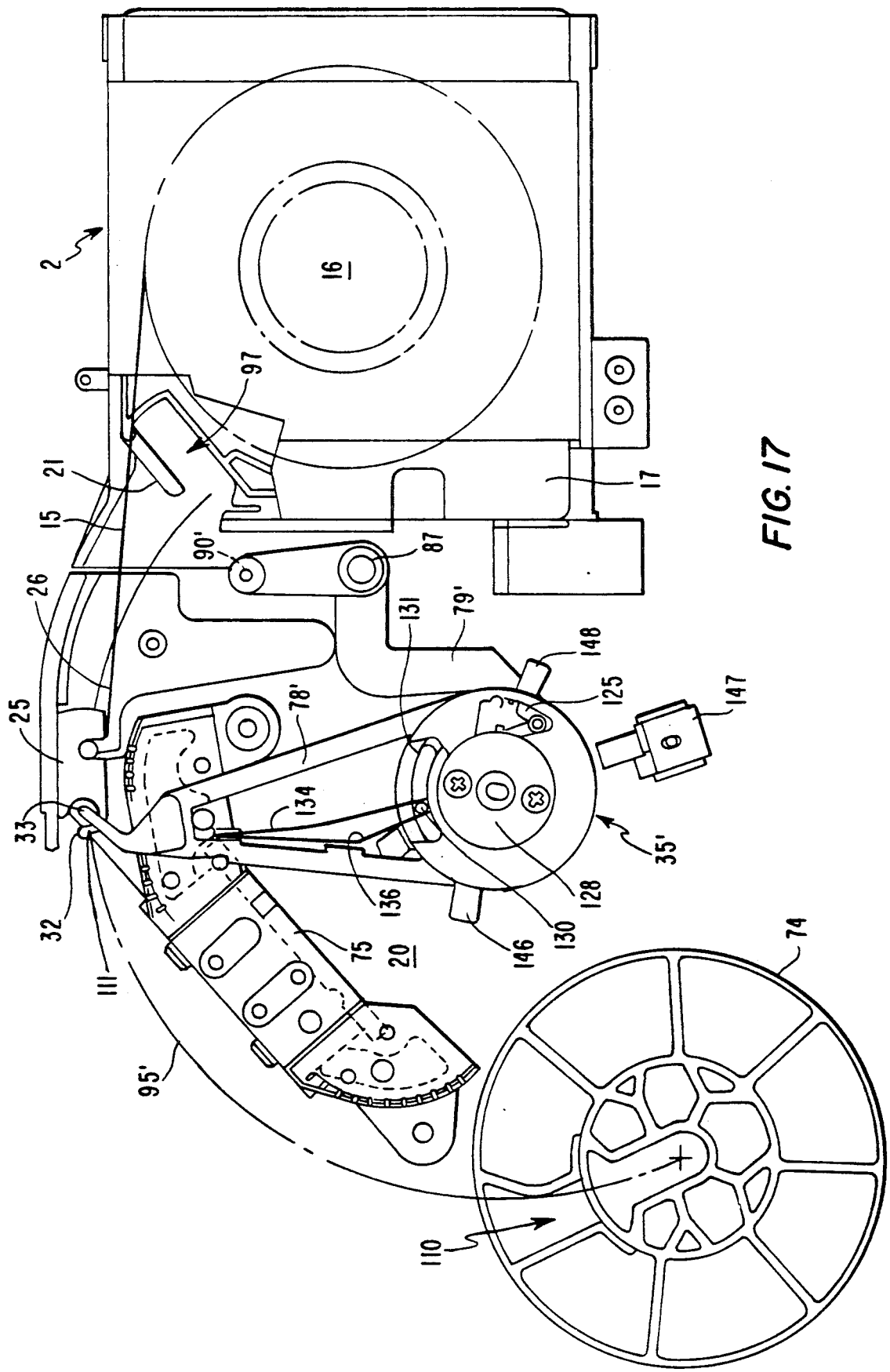
Figure 18:
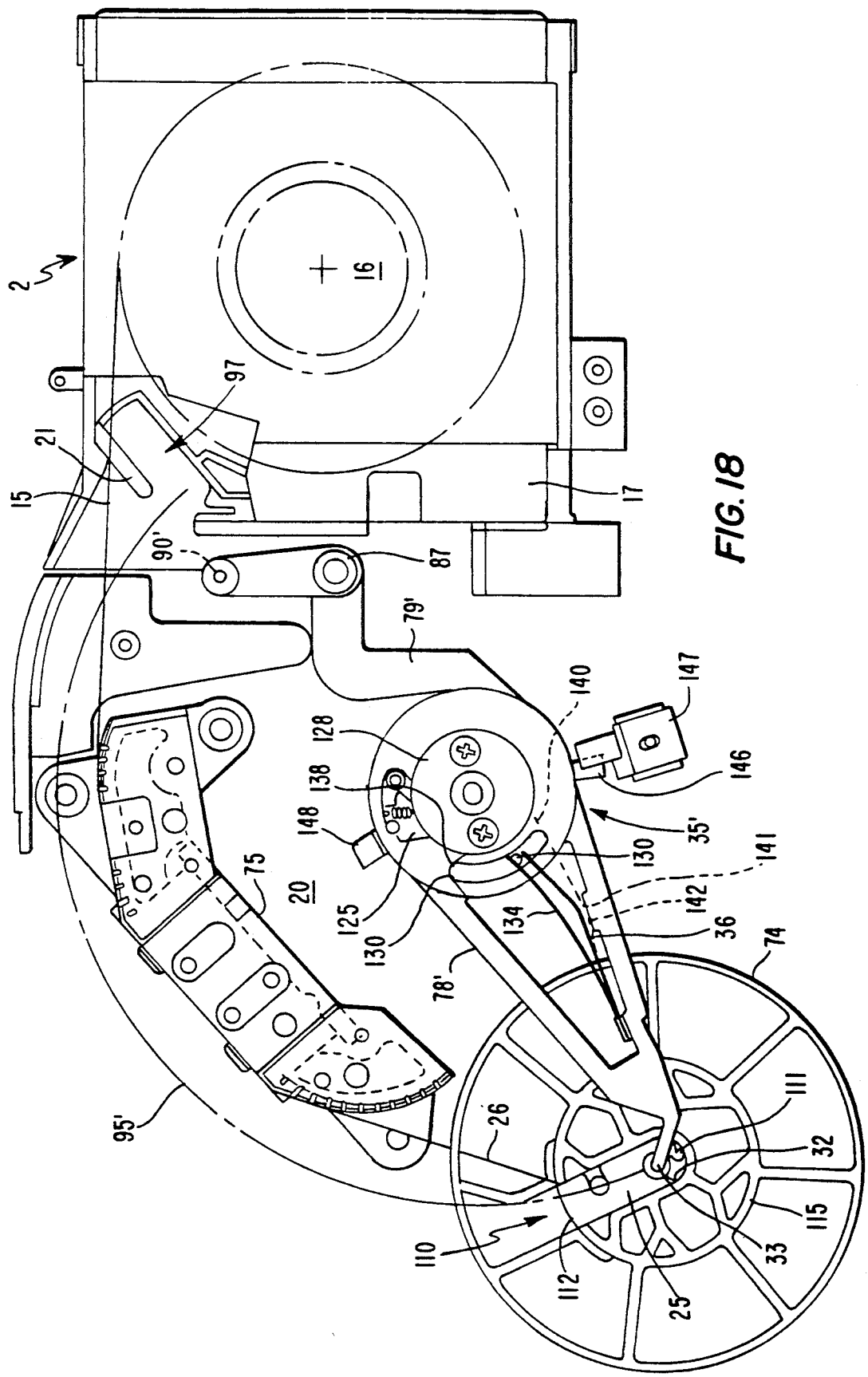

This counter-clockwise movement of the coupling 125 causes the lower arm 79′ to rotate to the position 105′ which is shown in FIG. 16, and to bring the driving pin 130 into contact with a driving spring 136 associated with the upper arm 78′. In the course of this rotation (which is again on the order of 15 degrees of movement of the coupling 125), the pin 90′ is caused to move along the slot 91′ of the upper arm 78′, until the pin 90′ is brought into general alignment with the opening 106′ provided in the slot 91′ which extends laterally to the exterior of the upper arm 78′. This motion serves to disconnect the upper arm 78′ from the lower arm 79′ so the upper arm 78′ is then free to rotate (beyond the limited movement of the lower arm 79′) in a counter-clockwise direction, toward the take-up reel 74.

Continued movement of the upper arm 78′ is accomplished through continued rotation of the driving pin 130 (by the coupling 125) against the driving spring 136, causing the leader block 25 to proceed through the arcuate transfer path 95′ (referring to FIG. 17) which extends from the corner 21 of the tape cartridge 2 to the take-up reel 74, under the influence of the motor 76′. During this period, the follower 132 is caused to progress along constant radius portions 137 of the track 133 (see FIG. 14a), transferring control of the upper arm 78' from the drive pin 90' to the driving pin 130 while simultaneously maintaining the lower arm 79' in proper position for subsequent engagement during return of the leader block 25 to the tape cartridge 2 as will be described more fully below. To be noted is that the motor 76' is again fully sufficient to provide the relatively small torque which is necessary to accomplish this transfer, and that the configured tracks 118 of the take-up reel 74 will again assist in properly delivering the leader block 25 to the nest 110 formed in the hub 115 of the take-up reel 74 (FIG. 18) as previously described.

A typical leader block unloading operation is initiated by rotating the coupling 125 in a clockwise direction, so that the driving pin 130 will apply a compressive force against the leaf spring 134. This force causes the upper arm 78' to rotate in a clockwise direction, withdrawing the leader block 25 from the nest 110 and causing the leader block 25 to progress toward the tape cartridge 2, along the transfer path 95', responsive to continued clockwise rotation of the upper arm 78'. The tracks 118 again operate to facilitate a controlled withdrawal of the leader block 25 from the hub 115 of the take-up reel 74 in the course of this transfer. To be noted is that the leaf spring 134 will operate to provide sufficient force to withdraw the leader block 25 from the nest 110, even in the event that these two structures have come to stick to one another resulting from operation of the transport 1, due to continued compression of the leaf spring 134 by the driving pin 130. In extreme circumstances, it is even possible for the driving pin 130 to travel the length of the slot 131, contacting the end 138 of the slot to positively withdraw the leader block 25 from the nest 110. In such cases, the leaf spring 134 will operate to return the upper arm 78' to its correct alignment relative to the coupling 125, to properly align the upper arm 78' (the slot 91') for proper engagement by the lower arm 79' (the pin 90') as the leader block 25 approaches the tape cartridge 2.

Figure 19:
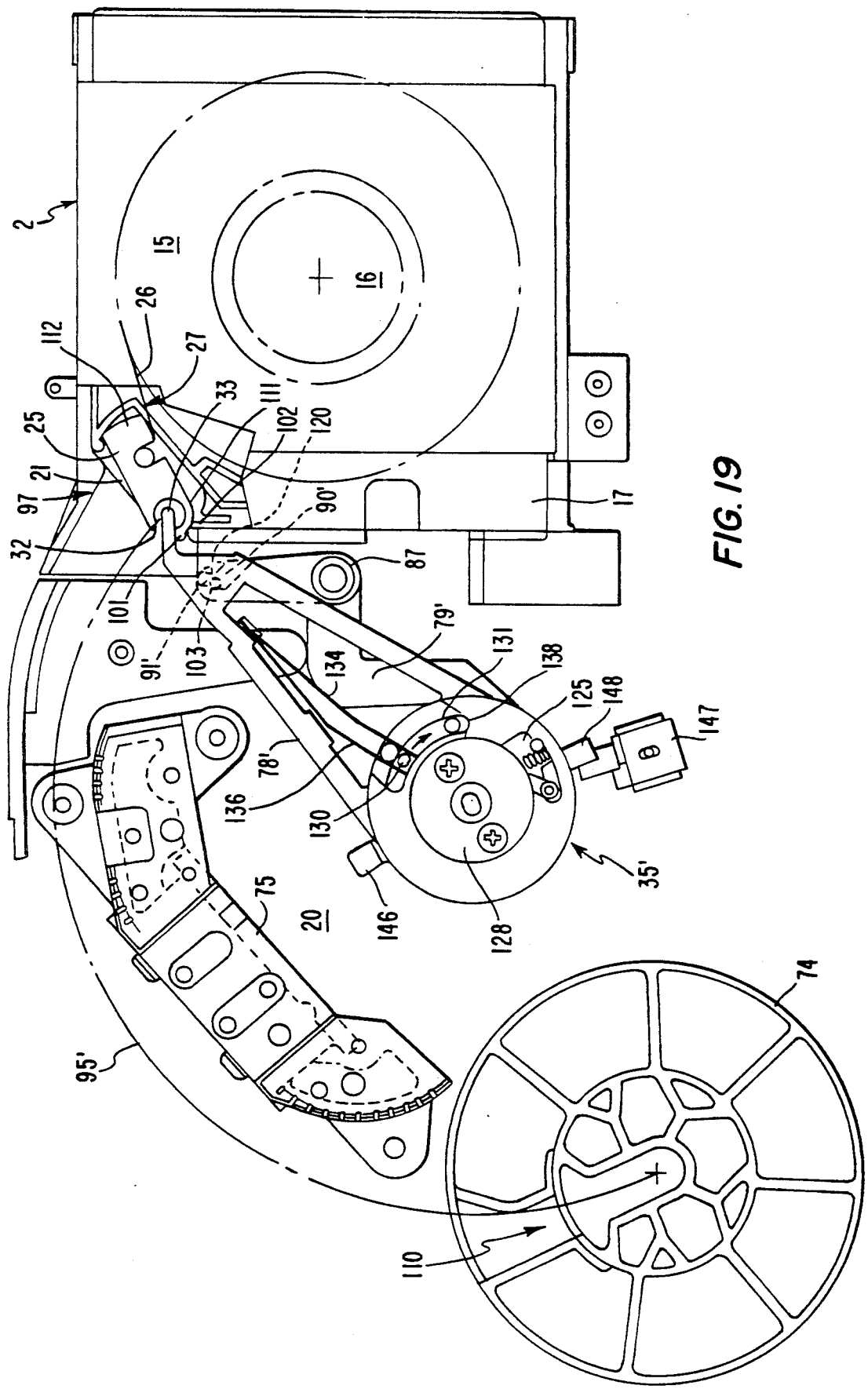
FIG. 19 is a top plan view similar to those of FIGS. 15 to 18, showing operation of the alternative embodiment leader block loading/unloading mechanism to replace the leader block within the tape cartridge.

Referring to FIG. 19 of the drawings, rotation of the upper arm 78' will continue until such time as the leader block 25 is positioned just outside of the corner 21 of the housing 17, and is ready for reinsertion into its nesting 97. In the course of reaching this position, the opening 106' in the slot 91' of the upper arm 78' will engage the pin 90' of the lower arm 79', and the follower 132 of the lower arm 79' will be returned to the configured portion 135 of the track 133. Continued clockwise rotation of the coupling 125 will cause the follower 132 to traverse the configured portion 135 of the track 133, which will in turn cause the lower arm 79' to rotate the drive pin 90' in a generally clockwise direction with respect to the pivot 87, and against the edge of the slot 91'. This levering action will again operate to provide sufficient force to cause the tip 101 of the leader block 25 to pass the flange 102 of the housing 17, returning the leader block to its seated position within the tape cartridge 2. The tape cartridge 2 is accordingly made ready for ejection from the transport 1, as previously described.

The leader block loading/unloading mechanism 35' operates to develop a highly controlled means for transferring the leader block 25 between the tape cartridge 2 and the take-up reel 74. For example, it is important to reduce potential impacts upon the reducing gears of the motor which operates the mechanism, to maximize its service life. The leader block loading/unloading mechanism 35' generally operates to reduce impacts upon the motor gears, at each end of the mechanism's travel by permitting an appropriate overtravel of those components of the mechanism which might tend to produce such undesirable impacts, as follows.

Following a leader block loading operation, steps are taken to decouple the upper arm 78' from the driving pin 130 by lengthening the slot 131 which receives it (as well as the track 133 of the coupling 125). Accordingly, when the upper arm 78' comes to a stop (and the motor 76' is shut off), continued rotation of the motor 76' and coupling 125 is permitted to avoid an adverse impact upon the motor gears. This continued rotation is limited and controlled by the driving spring 136, which operates to receive the driving pin 130 and resist its counterclockwise progression (as shown in phantom at 140 in FIG. 18) until power to the motor 76' is discontinued, and to thereafter return the driving pin 130 to its nominal position relative to the upper arm 78'. A stepped reaction is preferably provided for this purpose by providing a knee 141 in the spring 136 which, following contact with the edge 142 of the upper arm 78', serves to increase the reactive force which is then applied to the then-rotating driving pin 130.

Power to the motor 76' is discontinued responsive to a flag 146 which extends from the upper arm 78', and which operates in combination with an interrupt sensor 147 which is fixed upon the transport apparatus 20, as follows. Just before the leader block 25 becomes seated within the nest 110 of the take-up reel 74, the flag 146 operates upon (interrupts a beam) the interrupt sensor 147. A suitable time delay is then allowed to be certain that the leader block 25 has become fully seated, at which time electrical power to the motor 76' is discontinued and the motor 76' is stopped (or in the process of being stopped) by the driving spring 136, as previously described. The energy which is stored by the driving spring 136 then acts to rotate the driving pin 130 (clockwise) back to a neutral position (where no forces are exerted on either of the springs 134, 136). This, in turn, allows the guide pin 33 of the upper arm 78' to "float" freely within the slot 32 of the leader block 25 so that no contact forces (and therefore no wear) occur at this interface during subsequent rotation of the take-up reel 74.

In the course of a leader block unloading operation, steps are taken to stop the motor 76' as the follower 132 leaves the configured portion 135 of the track 133, which generally corresponds to a seating of the leader block 25 in its nesting 97, and a dwell zone 143 is provided in the track 133 (see FIG. 14a) to permit an appropriate overrun of the motor 76' following its shut-down. The dwell zone 143 is preferably increased to a sufficient length to receive the follower 132 without requiring a carefully timed shut-down of the motor 76'. Moreover, because the dwell zone 143 is radial to the center of the coupling 125, no motion of the arm 79' is produced while the follower 132 traverses this zone.

Power to the motor 76' is again discontinued responsive to a flag 148, which in this case extends from the coupling 125, and which again operates upon (interrupts the beam) the interrupt sensor 147. As the follower 132 enters the dwell zone 143, the flag 148 is caused to interact with the interrupt sensor 147 (see FIG. 19), which in turn operates to discontinue the power to the motor 76'. Appropriate dynamic braking is then applied to the motor 76' to stop the motor while the follower 132 lies within the dwell zone 143.

To be noted is that the leaf spring 134 will generally apply an undesirable resistive force to the driving pin 130 (and accordingly the motor 76') when seating of the leader block 25 within the nesting 97 of the tape cartridge 2 is in progress (and when increased operating forces are required). However, this potentially adverse affect is reduced because the forces involved are then being applied in a direction which is generally tangent to the direction of motion of the driving pin 130.

In the course of a leader block unloading procedure, it becomes necessary to ensure that the leader block 25 has been properly seated in the nesting 97 irrespective of its broad tolerances, and that the guide pin 33 is returned to the position which is proper for accepting another tape cartridge after operations upon the tape cartridge 2 have been completed. A spring-loaded overdriving feature is therefore provided as follows, with reference to FIG. 14a of the drawings. In the event that the leader block 25 becomes fully seated in the nesting 97 before the coupling 125 has had an opportunity to complete its intended rotation (to draw the follower 132 fully along the configured portion 135 of the track 133), a spring loaded gate 145 is provided to allow the driving pin 130 to pass from the configured portion 135 of the track 133 to the dwell zone 143 (to complete the unloading operation as previously described without an undesirable impact upon the gears of the motor 76') by rotating out of the way as shown in phantom in FIG. 14a, at 144. The shape of the active region represented by the configured portion 135 of the track 133 serves to produce a maximum required motion at the peak 149, which then backs off before the dwell zone 143 is entered.

To further assist in reducing impacts upon the motor's gears during the above-described leader block loading and unloading operations, steps are preferably taken to reduce the voltage (then at a maximum) which is ordinarily applied to the motor 76' during the predominant portions of its travel to a decreased level slightly before the end of its travel in the course of a leader block loading or unloading procedure. This operates to reduce the speed of the motor 76' at the end of its anticipated travel, further assisting in reducing the forces which are applied to the motor gears. This is accomplished in otherwise conventional fashion, using the available Hall effect sensors of the motor which determine the approximate position of the upper arm 78' in the course of its operation.

The leader block loading/unloading mechanism 35' also operates to effectively locate the various components of the mechanism for proper operation as previously described. Specifically, the track 133 operates to maintain the lower arm 79' in proper position to receive the upper arm 78' during a leader block unloading operation, without the need for a retaining spring such as the spring 58 of the lower arm 79, and assures that the drive pin 90' is moving under control as it engages and disengages the slot 91' of the upper arm 78' (by controlling movement of the follower 132 within the track 133 fully along its travel through the configured region 135). This operates to minimize impacts and assure a continuous motion of the leader block 25 in both directions.

As previously indicated, in order to provide a transport apparatus 20 which is capable of fitting within an 8 inch form factor or footprint yet which is capable of providing performance characteristics generally associated with somewhat larger equipment, it is not only necessary to provide an appropriate leader block loading/unloading mechanism but also to provide an improved tape path which is capable of properly guiding the web of tape 15 within the transport apparatus 20 despite the relatively short tape transfer path which is available. A variety of features are provided for this purpose.

Figure 20:
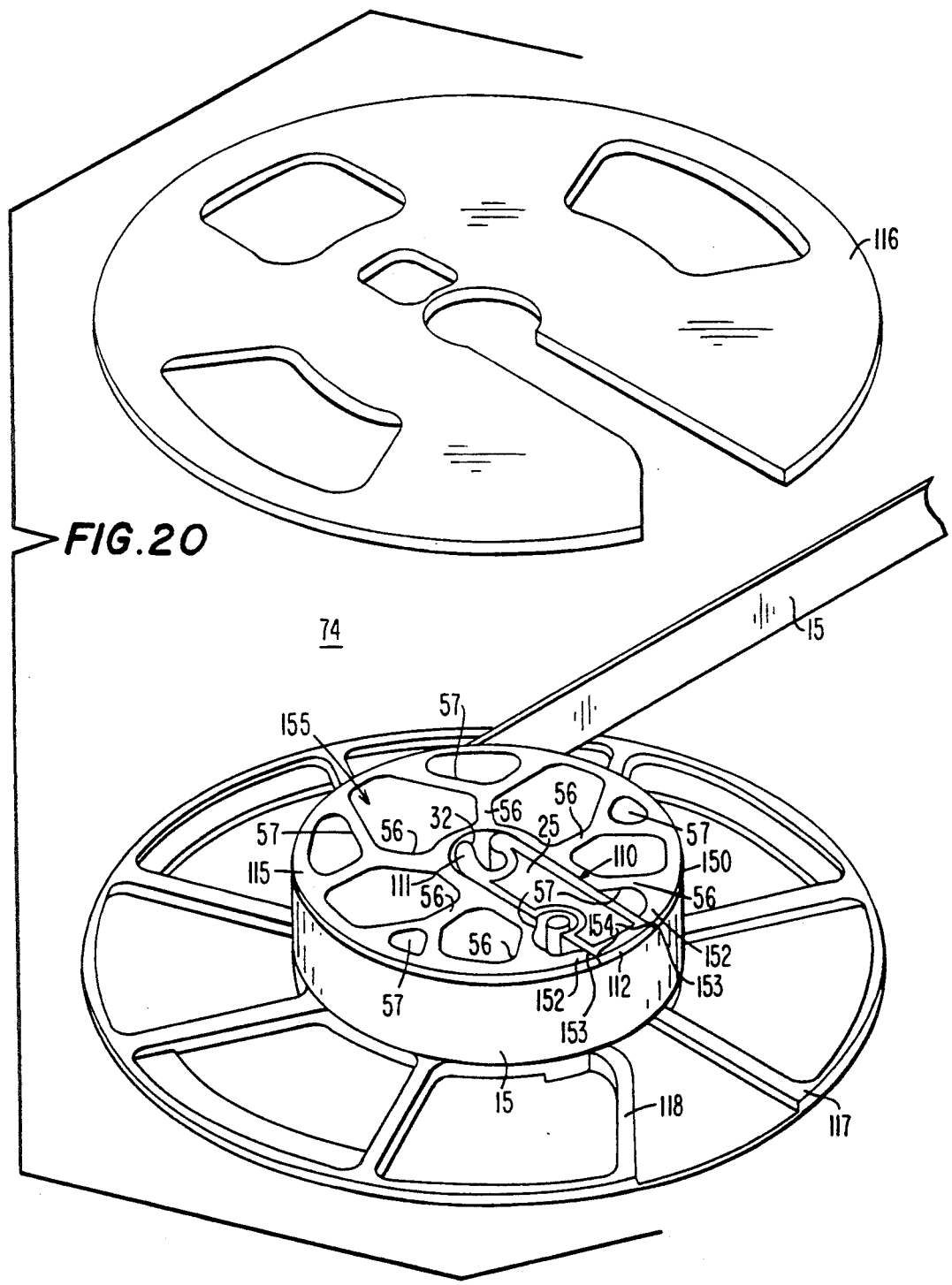
FIG. 20 is an exploded, isometric view of the take-up reel of the transport apparatus.

For example, one important aspect of proper tape path control within the transport apparatus 20 relates to the manner in which the web of tape 15 is wound upon the take-up reel 74. Important in this regard are the manner in which the leader block 25 is seated within the nest 110, as well as packing of the web of tape 15 upon the hub 115 of the take-up reel 74. The transport apparatus 20 of the present invention is therefore provided with a take-up reel 74 which is specially configured to accommodate these two needs, with reference to FIG. 20 of the drawings.

Generally speaking, the take-up reel 74 is comprised of a hub 115 and spaced flanges 116, 117 as previously described. A variety of resilient materials may be used to form these various structures.

It is important to properly configure the nest 110 which receives the leader block 25 so that the leader block 25 is securely received within the nest 110, and so that the end 112 of the leader block 25 will properly correspond with the periphery 150 of the hub 115. The reason for this is to make sure that these two structures co-terminate with one another to avoid discontinuities at this interface which could cause irregular packing of the web of tape 15.

Potential defects are minimized by providing a nest 110 for the leader block 25 which is not only correspondingly configured to the leader block 25, but which further includes an entranceway, at 151, which is provided with an opposing pair of cantilevered arms 152 positioned at the periphery 150 of the hub 110. This results in an appropriately configured nest 110 which is capable of slidingly receiving the leader block 25 during initial leader block loading, but which is later capable of closing down upon the seated leader block 25 as the web of tape 15 is wound upon the hub 115. This is accomplished by forming the cantilevered arms 152 of a resilient, elastically deformable material (i.e., of appropriate elasticity and having a geometric cross-section of appropriate rigidity) so that as the web of tape 15 is wound upon the hub 115, compression of the cantilevered arms 152 at the periphery 150 will cause lateral faces 153 of the cantilevered arms 152 to deflect inwardly, engaging terminating portions 154 of the leader block 25 and completing the periphery 150. Preferably, this is accomplished by configuring each of the cantilevered arms 152 to progressively and continuously decrease in thickness (and stiffness) from the hub 115 to the lateral faces 153, to uniformly and progressively collapse the cantilevered arms 152 down upon the terminating portions 154 of the leader block 25. In this fashion, it is possible to develop an interface between the leader block 25 and the hub 115 which is virtually free of discontinuities, and which actually serves to uniformly locate (center) the leader block 25 within the nest 110.

To be noted is that the inherent resiliency of the cantilevered arms 152 also serves to facilitate the release of the leader block 25 from the nest 110 of the hub 115, by causing the lateral faces 153 to separate from the terminating portions 154 of the leader block 25, in turn releasing the leader block 25 for removal from the nest 110 as previously described. Of course, a certain degree of sticking between the leader block 25 and the nest 110, particularly between the lateral faces 153 of the cantilevered arms 152 and the terminating portions 154 of the leader block 25, will also be accommodated by the spring-pin clutch 100 of the leader block loading/unloading mechanism 35 and the leaf spring 134 of the leader block loading/unloading mechanism 35', which also serve to break this contact and free the leader block 25 for withdrawal from the nest 110.

Yet another aspect of proper tape path control is that of tape packing upon the hub 115. Again for the purpose of minimizing irregularities, it is important for the web of tape 15 to be packed upon the hub 115 of the take-up reel 74 so that the resulting pack remains balanced (round) and consistently positioned upon the take-up reel 74. To this end, the hub 115 of the take-up reel 74 is provided with a honey-comb structure 155 which permits a uniform and limited, yet controlled deformation (collapse) of the hub 115 responsive to packing of the web of tape 15 upon it. This permits a marginal deformation of the hub 115 to adjust to mechanical tolerances within the system, as well as non-uniform tape tensions. More importantly, this permits the hub 115 to collapse uniformly (maintaining a cylindrical shape), avoiding the tendency for the web of tape 15 to ride up on the tape pack due to non-uniformity. The honey-comb type structure 155 preferably takes the form of a plurality of radially projecting ribs 156 which terminate in a plurality of sectors 157 which extend to the periphery 150 of the hub 115. These structures serve to provide adequate support for the web of tape 15 which is received upon the hub 115, while permitting the limited deformation (collapsibility) which is desirable for enhanced tape packing.

Figure 21:
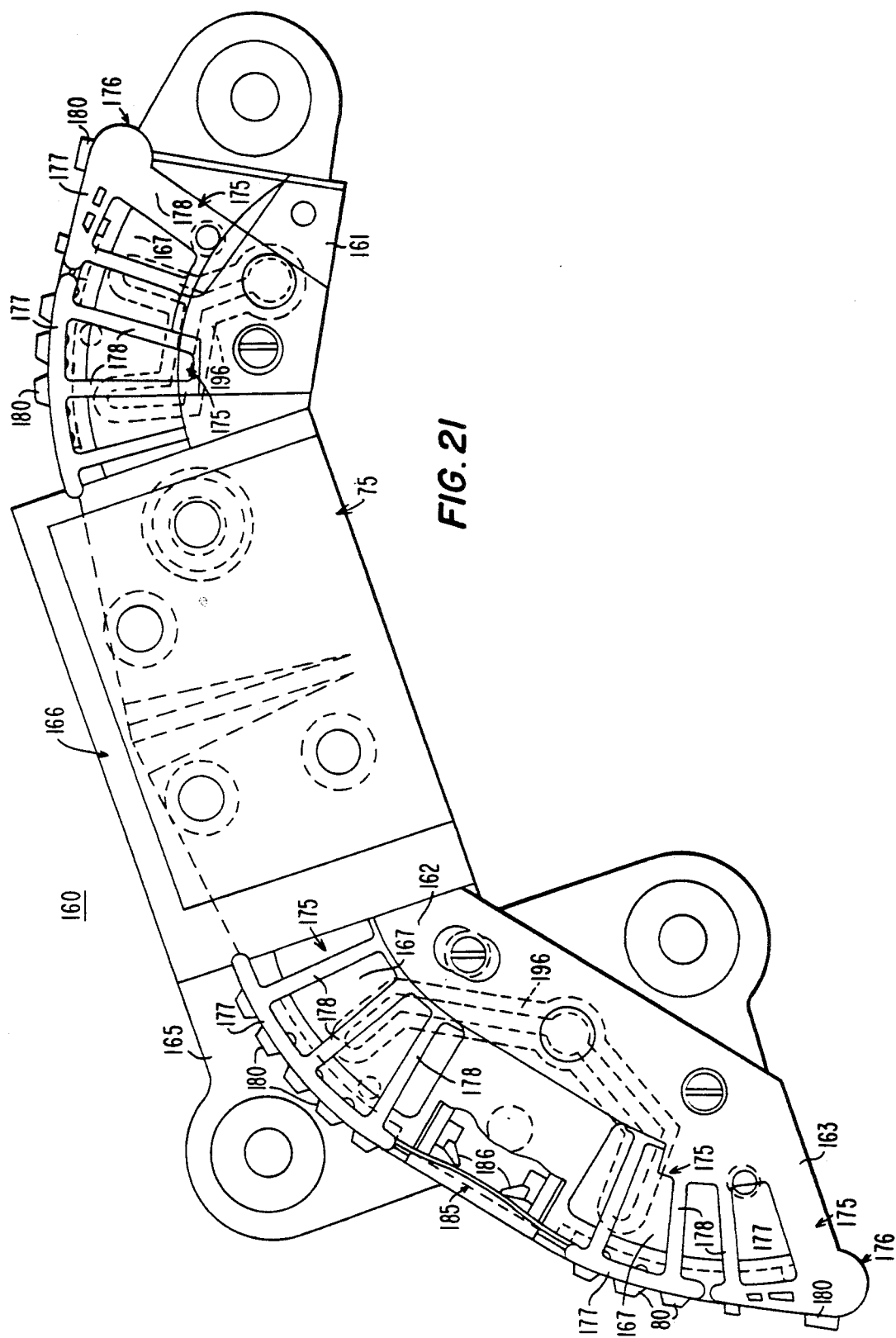
FIG. 21 is a top plan view of the combined head and guide assembly of the tape transport of FIGS. 3 and 4.
Figure 22:
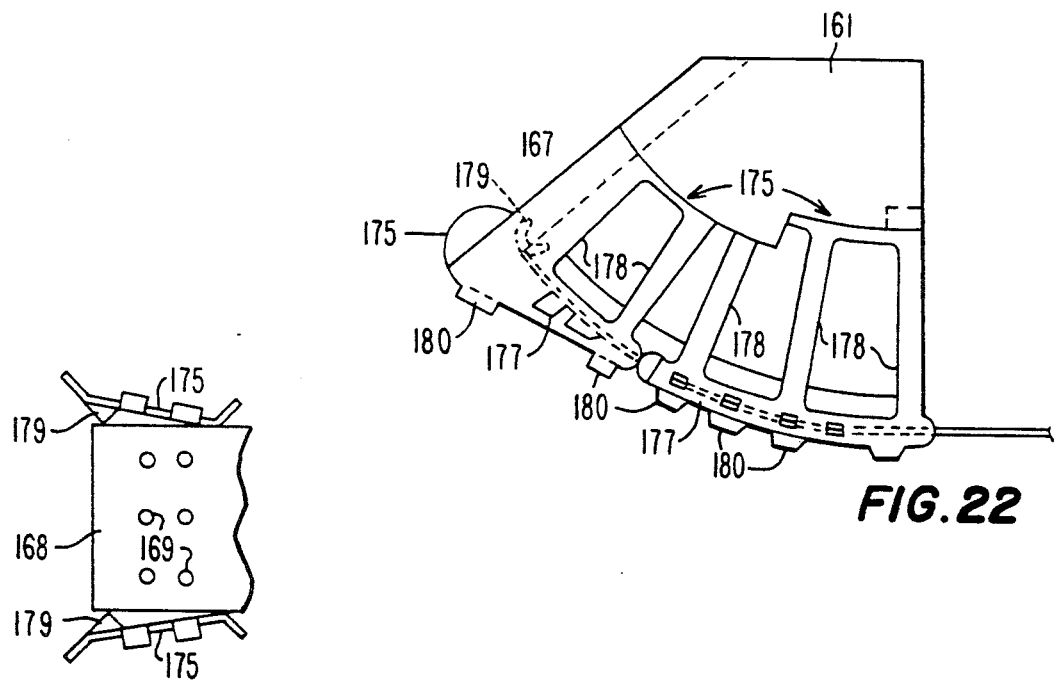
FIGS. 22 and 24 are top plan views of the right and left guides of the combined head and guide assembly of FIG. 21, respectively.
Figure 24:
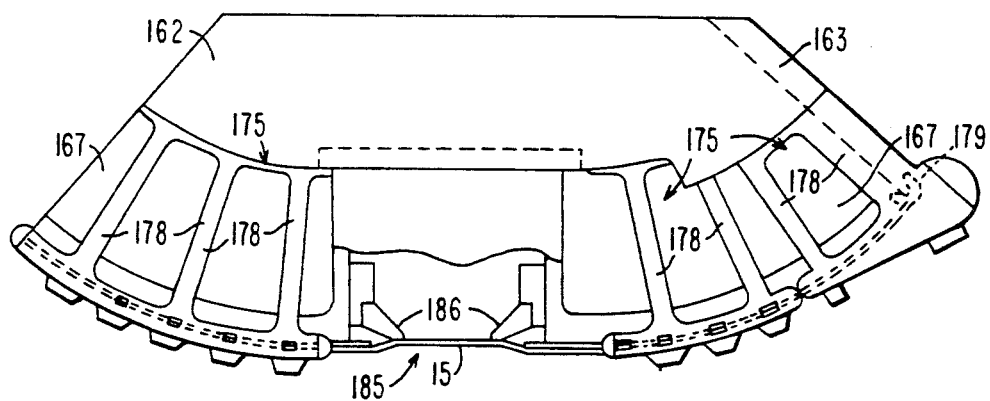
Figure 25:
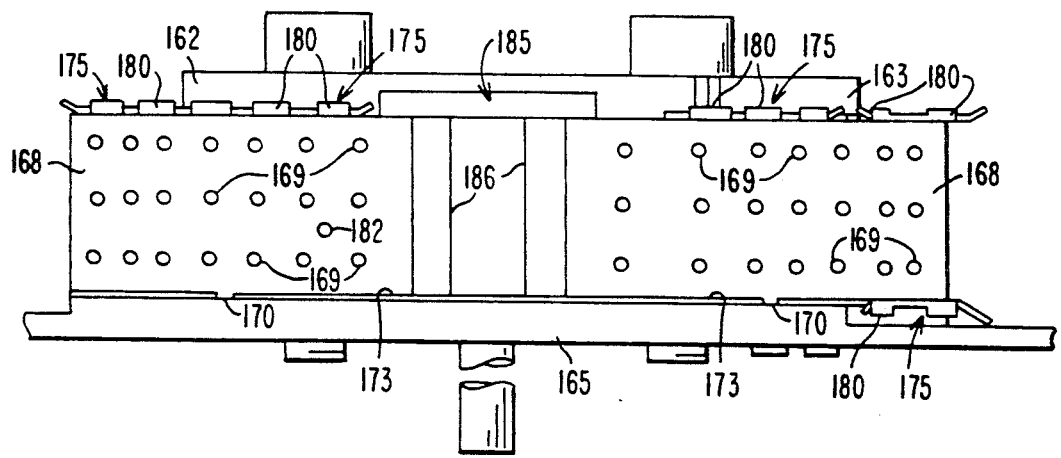

Yet another important consideration relates to the overall tape path for the transport apparatus 20, and the configuration of the magnetic read/write head 75 and the tape guides which surround it to assure an appropriate tape wrap about the head 75 within the confines of the available tape path. To correctly establish these factors, a head/guide assembly 160 is provided which essentially operates to define the tape path for the transport apparatus 20. Referring to FIG. 21 of the drawings, the head/guide assembly 160 is generally comprised of a right guide 161 (FIGS. 22 and 23) and a pair of left guides 162, 163 (FIGS. 24 and 25) Which are positioned on opposite sides of the head 75 and which are mounted to a common plate 165. Common mounting of these components is preferable for ease of set-up and subsequent servicing since the necessary adjustments for the head 75 can be made separately from the transport apparatus 20, prior to replacing the assembly within the transport apparatus 20 after any necessary adjustment and/or servicing has been completed. To be noted is that the head/guide assembly 160 is also well adapted to moveable head assemblies, in addition to the fixed head assembly which has been selected for illustration in the drawings. In either case, the read/write head 75 is preferably mounted to the plate 165 by an adjustable skew plate 166 to facilitate adjustments of head wrap, squareness and azimuth.

Each of the guides 161, 162, 163 generally takes the form of an air bearing and is therefore a hollow structure. A preferred construction for this purpose is to provide a hollow body 167 formed from graphite filled plastic, which is in turn covered by a correspondingly curved metal foil 168. The metal foil 168 is provided with a series of apertures 169 for metering compressed air to the surface of the guides 161, 162, 163, to effectively space the web of tape 15 from the surface of the guides 161, 162, 163 in conventional fashion. The metal foil 168 is also provided with appropriate means for locating the structure and to provide a low impedance ground path (for static discharge). For example, the metal foil 168 can be provided with a depending tab 170 (see FIG. 25) for locating the metal foil 168 and for electrically connecting the metal foil 168 with the mounting plate 165 (developing the desired low impedance ground path) through a coil spring which surrounds the depending tab 170 and extends to the mounting plate 165 (to eliminate the need to manufacture the depending tab to close tolerances). Alternatively, the metal foil 168 can be provided with a raised portion 171 (see FIG. 23), preferably on the order of 20 mils, for assuredly contacting one of the tabs of the corresponding guide spring (to be described below) for the guide (which is in turn grounded by its mounting hardware). The raised portion 171 is preferably located in a region of the corresponding guide which would not be used to guide the web of tape 15.

Conventional practice in manufacturing the metal foil 168 is to etch the desired foils (and apertures) from a flat substrate, and to then form (curl) the etched foils for application to the correspondingly curved guide bodies (the hollow body 167). However, it has been found that this procedure can lead to certain adverse conditions in the resulting foils. First, such foils tend to yield at differing rates along cross-sections which contain the apertures 169 and cross-sections which do not, causing the foils to become faceted when formed. This can lead to difficulties in properly supporting the web of tape 15. Second, the edge of an aperture 169 can become locally raised above the radial surface of the curved foil 168, creating a sharp discontinuity at this location. Such conditions can lead to damage of the oxide coating provided on the web of tape 15 (and a loss of data) in the event that the guide (air bearing) becomes unable to support the web of tape 15. This problem is overcome by altering the process which is used to form the foils 168, such that the desired foils are etched (following their exposure to appropriate artwork) from a substrate which is first curled to develop the radius which is appropriate for application to the corresponding hollow bodies 167.

A reference surface 173 is developed on the mounting plate 165 which receives the guides 161, 162, 163, to properly guide the web of tape 15 through the head/guide assembly 160. To minimize wear at this reference surface 173, resulting from movement of the tape edge across it, the reference surface 173 is preferably coated with a hard material such as a nitride of titanium or silicon to reduce such wear. Of course, this surface may first be prepared, as appropriate, to receive the hard material coating, including necessary surface finish and edge rounding, as desired. Alternatively, this reference surface may be developed by bonding ceramic inserts (preferably formed of an oxide of aluminum such as monocrystalline or polycrystalline alumina) to the mounting plate 165, which are then machined to their required size and finish. To be noted is that if these ceramic inserts are used as the reference surface, the low resistance ground path which is to be developed for the foils 168 must be established through the guide springs located over the guides 161, 162, 163, since the depending tab 170 will no longer be able to access the base material of the mounting plate 165.

To further enhance alignment of the web of tape 15 within the head/guide assembly 160, a series of compliant guide springs 175 are provided along upper and lower portions of the guides 161, 162, 163. The purpose of the guide springs 175 is to exert a controlled force on the web of tape 15 which is perpendicular to the reference surface 175, to hold the web of tape against the reference surface 173 using the minimum amount of force possible to reduce wear at this interface.

The potential for misalignments of the web of tape 15 will be greatest at the outboard edges 176 of the head/guide assembly 160, which receive the web of tape 15 from the supply reel 16 and the take-up reel 74, respectively. The head/guide assembly 160 of FIG. 21 is therefore configured to apply the greatest amount of retaining forces in these regions, to assure proper registration of the web of tape 15, and to apply lesser forces for this purpose toward the center of this guiding structure. To develop these varying forces, the right guide 161 and the left-most guide 163 are preferably provided with guide springs 175 which have a variable spring rate which progressively increases toward the outboard edges 176.

Figure 26:
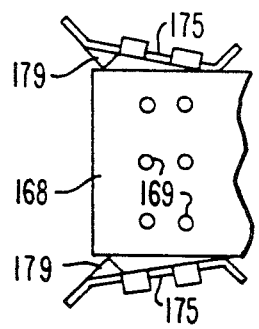
FIG. 26 is a side elevational view similar to FIG. 23, showing an alternative embodiment guide spring arrangement.
Figure 23:
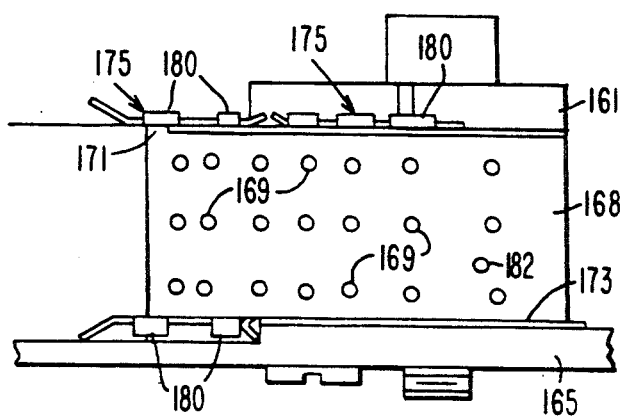
FIGS. 23 and 25 are side elevational views of the guides of FIGS. 22 and 24, respectively.

This is accomplished by forming the guide springs 175 from a thin sheet of resilient material (either a metal or a composite metal and plastic) which is coated with an appropriate surface material (such as a nitride of titanium or silicon) to reduce wear, or which is alternatively provided with ceramic pads (again preferably formed of an oxide of aluminum such as monocrystalline or polycrystalline alumina) bonded to its contacting surfaces, and which has a rim 177 of varying width (thickness) which increases (preferably linearly) toward the outboard edges 176 to develop the variable spring rate which is desired to achieve proper tape guidance in accordance with the present invention. Variations in the spring rate provided by the guide springs 175 are also capable of being developed by varying the width of the ribs 178 associated with the guide springs 175 (as shown in FIGS. 21 and 23 of the drawings) to provide an increased stiffness according to the thickness of the ribs 178. As shown in FIG. 26, the guide springs 175 can also be configured to (preferably linearly) diverge slightly (varying the distance between opposing guide springs 175) toward the outboard edges 176, to in essence gather the web of tape 15 for proper presentation to the remainder of the tape guiding assembly, without buckling, by forming a dimple 179 in the guide spring 175 (shown in phantom in FIG. 21) for contacting the surface of the guide which receives it. Protruding tabs 180 are additionally provided to aid in threading the web of tape 15 along the transfer path 95, 95', by directing the upper edge of the web of tape 15 under the guide springs 175, and to prevent discontinuities (sharp edges) from being located in the same plane as the top edge of the web of tape 15 (which could cause damage to the top edge).

To be noted is that in this configuration, the guide springs 175 are the only structures which are required to properly align the web of tape 15 for proper guidance, and that the degree of alignment which is required (and accordingly the amount of contact between the guide springs 175 and the web of tape 15) will only be so much as is required to bring the web of tape 15 back into its correct alignment. Otherwise, contact between the guide springs 175 and the web of tape 15 is kept to a minimum to reduce unnecessary wear. Also to be noted is that the guide springs 175, as well as the other aligning features associated with the head/guide assembly 160, cooperate to permit an appropriately aligned (gathered without buckling) transport of the web of tape 15, which is sufficient for effective presentation of the web of tape 15 to a high performance read/write head, within the limited confines of an 8 inch form factor or footprint and the limited available tape path which results.

To further regulate transport of the web of tape 15, the right guide 161 is provided with a pneumatically operated tape tension sensor, which monitors variations in pressure resulting from changes in tension in the web of tape 15 as the web of tape 15 is drawn across the guide 161. This is accomplished by measuring changes in pressure at a sense orifice 182 provided in the metal foil 168 of the guide 161, which is operatively connected with a conventional solid state pressure transducer (see FIG. 28). A similar tension sensor is also preferably provided in the center-most guide 162, to provide an indication of tape tension on opposite sides of the read/write head 75. This is done to permit the measured tape tension to be averaged across the head 75, and to identify possible sticking of the web of tape 15 at the surface of the head 75 (e.g., during start-up).

The left guides 162, 163 further include a vacuum loaded, double knife edge tape cleaner 185. Each of the knife edges 186 are formed of an appropriately hard material and are arranged so that their angle of attack with respect to the web of tape 15 will operate to remove asperities and inclusions in the tape surface without damaging the tape surface. A pair of knife edges 186 are provided to accomplish this irrespective of the direction in which the web of tape 15 is traveling.

To further improve the results achievable by the knife edge tape cleaner 185, the knife edges 186 are no longer simply positioned within a supporting block but rather are buried within the block and vacuum loaded to effectively draw the web of tape onto the knife edges 186 to ensure proper results irrespective of wear of the blades or potential changes in tape wrap responsive to variations within the transport apparatus. In fact, the vacuum loaded knife edge tape cleaner 185 virtually eliminates the need for tape wrap at the knife edges 186 (approximately one degree of tape wrap remains preferred to provide the contact pressures which are needed to remove debris), avoiding the redeposit of removed material onto the web of tape 15, and eliminating forces which often tended to move the tape away from the reference surfaces provided. Vacuum loading at the knife edges 186 further makes sure that the tape is properly oriented to the knife edges 186, without the need for constant mechanical adjustment of the knife edge tape cleaner 185 (to account for wear) as was previously required for tape cleaners of this general type. What is more, placement of the knife edge tape cleaner 185 between an adjacent pair of guides (i.e., the guides 162, 163) saves in overall space utilization, facilitates close control of the location of the knife edges 186, and assists in correcting any variations in tape guidance or control which are caused by operation of the knife edge tape cleaner 185.

Figure 27:
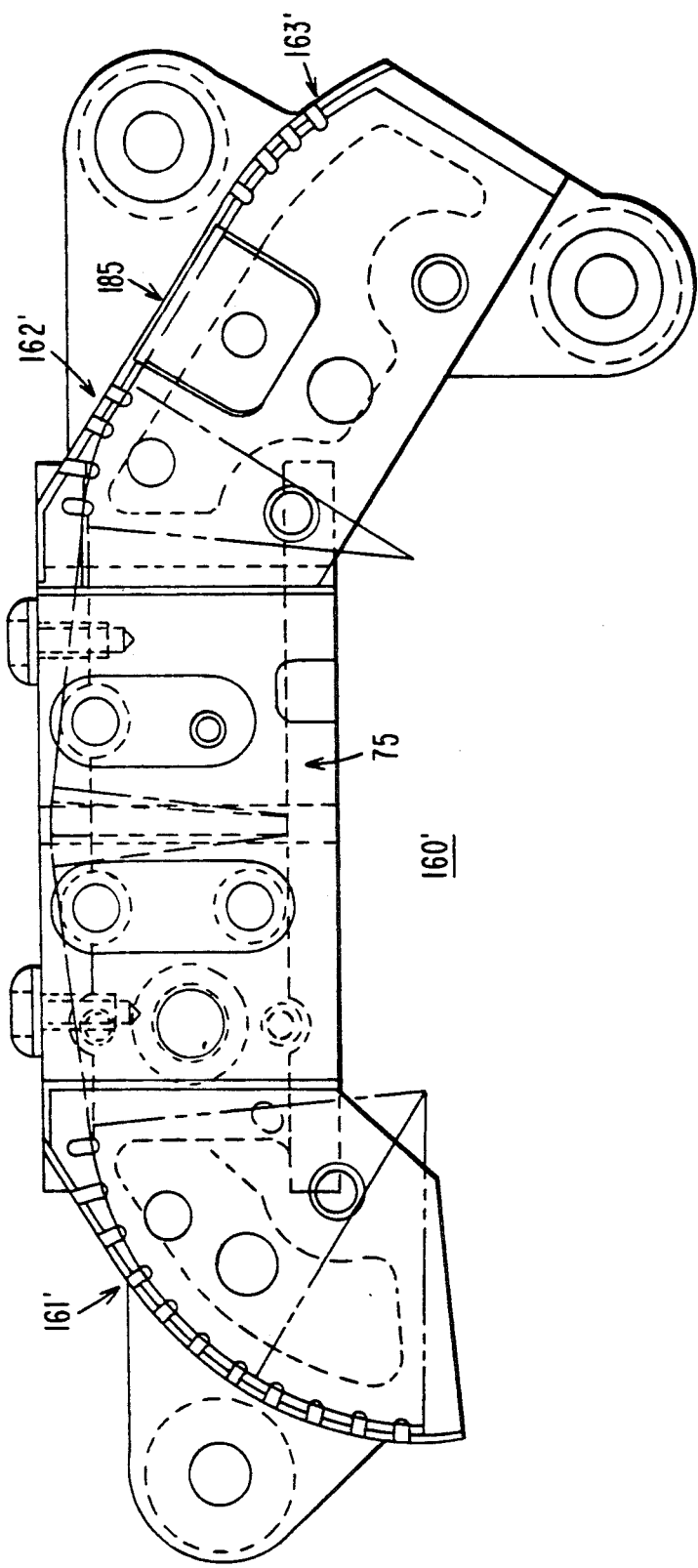
FIG. 27 is a top plan view of the alternative embodiment combined head and guide assembly of the transport apparatus of FIGS. 15 to 19.

FIG. 27 shows an alternative embodiment head/guide assembly 160' which is configured to develop a modified tape path 95' (as shown in FIGS. 15 to 19) which is capable of accommodating even greater misalignments in the web of tape 15 which is being presented to the transport apparatus 20. By locating the head 75 even farther from the tape cartridge 2, the head/guide assembly 160' operates to accept and guide a web of tape 15 leaving the tape cartridge 2 which is positioned significantly off the nominal tape path centerline for the transport apparatus 20 (e.g., when the web of tape is poorly stacked on the supply reel). The head/guide assembly 160' also operates to place the knife edge tape cleaner 185 on the supply side of the head 75, permitting the web of tape 15 to be cleaned before it is first presented to the head 75 (and accordingly, as it is withdrawn from the supply reel 16), in addition to cleaning the web of tape 15 during rewind.

While the majority of the components comprising the head/guide assembly 160' otherwise substantially correspond to those of the head/guide assembly 160, it is to be noted that the guides 161', 162', 163' have been provided with guide springs 175' which are configured to apply the greatest amount of retaining forces to the web of tape 15 along regions of the head/guide assembly 160' which operate to positively support the web of tape 15 (i.e., inboard regions of the guides 161', 162', 163'), to assure proper registration of the web of tape 15, and to apply lesser forces for this purpose toward the outboard edges 176' of the head/guide assembly 160'. This approach (which is also applicable to the head/guide assembly 160 earlier described) is again implemented by varying the spring rate of the guide springs 175', using the same techniques that were applied in varying the spring rate of the guide springs 175 (e.g., the spring rate of the outboard ribs 178' being lower than the spring rate of the inboard ribs 178' according to differences in rib thickness, etc.).

Compressed air for the guides 161, 162, 163 (161', 162', 163') and vacuum for the knife edge tape cleaner 185 is provided by an air supply system 190 which is configured to accommodate these two needs, as well as the 8 inch form factor or footprint which is assumed by the transport apparatus 20. Moreover, the air supply system 190 is configured to accommodate the web of tape 15 both when moving and when stationary. When moving, the primary need is to supply sufficient compressed air to the air bearings (the guides 161, 162, 163 and 161', 162', 163') to support the web of tape 15 as it passes across them, and sufficient vacuum to the knife edge tape cleaner 185 to properly operate as previously described. When stationary, the primary need is to supply sufficient compressed air to the read/write head 75 to prevent "tape stick" at the head 75 resulting from static contact between the head 75 and the web of tape 15.

Figure 28:
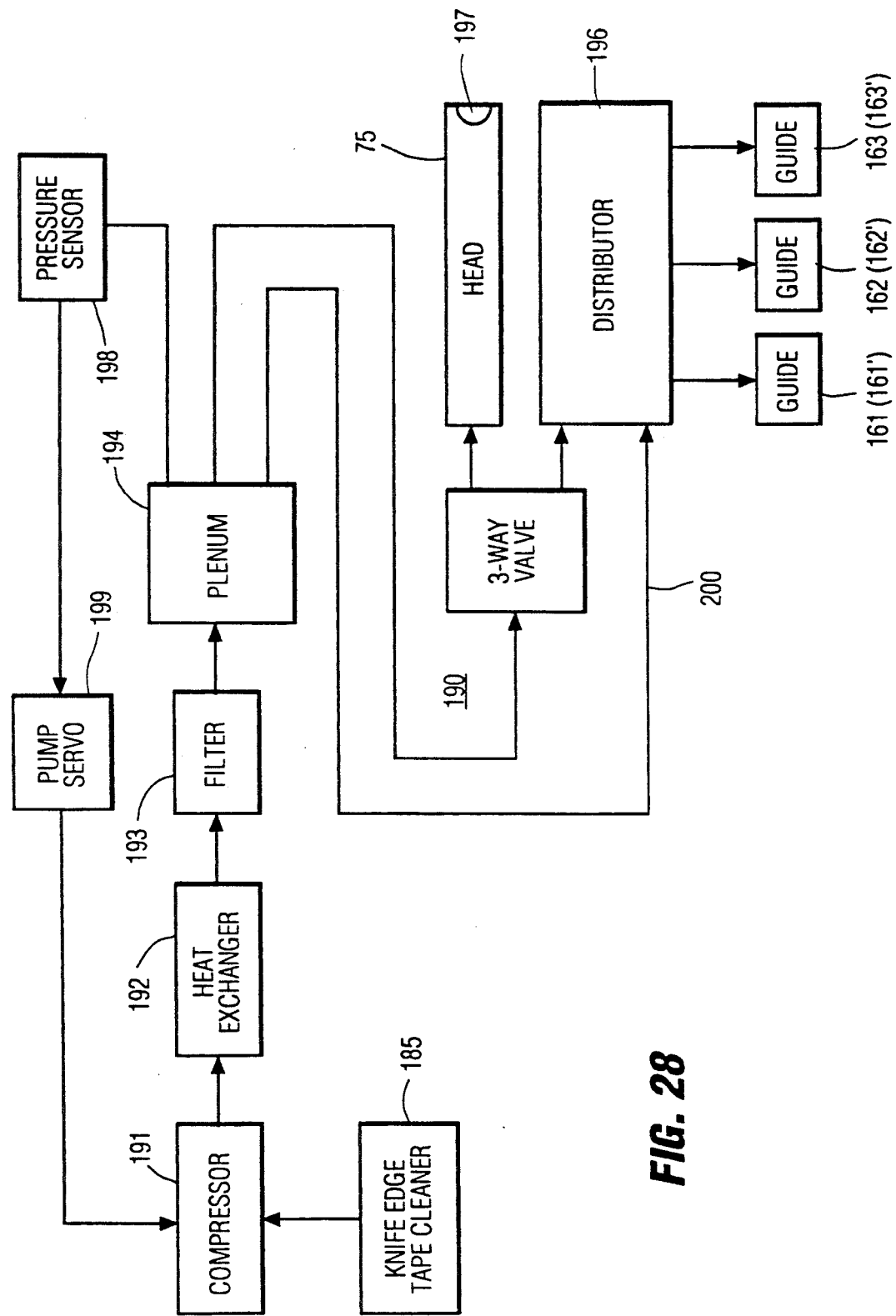
FIG. 28 is a block diagram showing the air/vacuum supply system for the tape transport.

Referring to FIGS. 3, 4 and 28 of the drawings, the air supply system 190 is generally comprised of a compressor 191 which delivers compressed air to a serially configured heat exchanger 192 and filter housing 193, for delivery to a distributing plenum 194. To be noted is that each of these components is sized to be retained within the enclosure of the transport 1, accommodating the 8 inch form factor or footprint which is desired.

Compressed air from the plenum 194 is in turn delivered to a 3-way valve 195 which selectively communicates with a multi-tube distributor 196 which provides compressed air to each of the tape guides (the guides 161, 162, 163 of FIG. 21 or the guides 161', 162', 163' of FIG. 27) or to a jet 197 formed in the read/write head 75. A solid state pressure sensor 198 monitors air pressure in the plenum 194 and is electrically connected (for feedback purposes) to the servo control 199 of the compressor 191. The plenum 194 additionally communicates with the multi-tube distributor 196 through high resistance line 200. In this fashion, air withdrawn at the knife edge tape cleaner 185 (developing the desired vacuum for its operation) is delivered to the compressor 191 (preferably through a filter associated with the compressor), for serial transfer to and between the heat exchanger 192, the filter housing 193 and the plenum 194. This compressed air (the pressure of which is monitored by the pressure sensor 198 and regulated by the servo control 199) is then available for supply to the 3-way valve 195, providing the compressed air which is needed for the correct transport of tape, as follows.

When the tape is stationary, steps are taken to reduce (by approximately one-half) the tension in the web of tape 15 (servo-controlled in known fashion) since less tape tension is required during this phase of operation. As a result, less air pressure and flow is required to retain the web of tape 15 away from the guides 161, 162, 163 or 161', 162', 163'. Sufficient compressed air for this purpose is available from the bypass which is developed by the high resistance line 200, for delivery to the multi-tube distributor 196 which feeds the guides. The 3-way valve 195 is then operated to actively supply available compressed air to the jet 197 associated with the head 75, for retaining the web of tape 15 away from its surface as is desired.

When the transport of tape commences, the valve 195 is switched to direct compressed air to the multi-tube distributor 196 (i.e., the guides 161, 162, 163 or 161', 162', 163'), and not the air jet 197. The increased amounts of compressed air which are then required during the active transport of tape are made available since there is no longer a need to divert a portion of the available compressed air to the air jet 197 associated with the read/write head 75.

In either case (tape stationary or moving), the compressor 191 is servo-controlled to properly regulate the supply of compressed air to the transport apparatus 20 as previously described. This is done to assure a proper supply of compressed air to the head 75 and the guides 161, 162, 163 or 161', 162', 163' when the web of tape 15 is stationary, and to the guides when the web of tape is in transport, irrespective of the number of apertures 169 in the metal foils 168 of the guides which are covered at any given time (which will necessarily vary according to the amount of tape which is wound upon the supply reel 16 and the take-up reel 74). Generally speaking, such servo-control of the system is provided by varying the voltage supplied to the compressor 191 according to the pressure detected at the pressure sensor 198, which is dependent upon the number of apertures 169 which are then exposed and the tension present in the web of tape 15. In any event, the pressure sensor 198 (and the associated servo control 199) and the 3-way valve 195 combine to permit a relatively small compressor (needed to fit within the desired 8 inch form factor or footprint), which would ordinarily be insufficient for its intended purpose, to adequately supply the compressed air which is needed for proper operation of the transport apparatus 20 as previously described.

Accordingly, it will be seen that the transport 1 previously described serves well to satisfy each of the objectives previously set forth. It will further be understood that the described transport 1 is capable of variation without departing from the spirit and scope of the present invention, and that various changes in the details, materials and arrangement of parts which have been herein described and illustrated in order to explain the nature of this invention may be made by those skilled in the art within the principle and scope of the present invention as expressed in the following claims.

What is claimed is:

1. A transport apparatus comprising:
   a loading rack for receiving a tape cartridge containing a web of tape on a supply reel and including a leader block for engaging a free end of said web of tape;
   a supply motor for engaging and rotating said supply reel;
   a take-up reel for receiving said leader block and said web of tape, for transport between said supply reel and said take-up reel;
   a take-up motor for rotating said take-up reel;
   leader block loading means for transferring said leader block from said tape cartridge to said take-up reel and for returning said leader block to said tape cartridge;
   a head and guide assembly including a magnetic read/write head and a plurality of guide means for receiving said web of tape and for directing said web of tape across said head; and
   air supply means for providing compressed air to said guide means;
   wherein said loading rack, said supply motor, said take-up reel, said take-up motor, said leader block loading means, said head and guide assembly and said air supply means are confined within an 8 inch form factor.

2. The apparatus of claim 1 wherein said transport apparatus includes moving means for moving said loading rack between a first position in which said tape cartridge is freely receivable within said loading rack and a second position in which said supply motor engages said supply reel and said leader block loading means engages said leader block.

3. The apparatus of claim 2 wherein said loading rack includes means for regulating said apparatus according to a characteristic of said tape cartridge.

4. The apparatus of claim 2 wherein said moving means comprises an articulated linkage extending from said loading rack, and camming means for engaging said articulated linkage and for moving said loading rack between said first position and said second position.

5. The apparatus of claim 4 wherein said articulated linkage includes interconnecting means for placing said loading rack at an angle as said loading rack is moved between said first position and said second position.

6. The apparatus of claim 5 wherein said interconnecting means is an elongated slot for interconnecting said loading rack and said articulated linkage.

7. The apparatus of claim 4 wherein said camming means includes means for regulating the position of said loading rack relative to said apparatus.

8. The apparatus of claim 7 wherein said regulating means comprises a slotted disk coupled with said camming means and a slot-detecting sensor coupled with said slotted disk.

9. The apparatus of claim 4 wherein said moving means includes means for ejecting a tape cartridge from said loading rack.

10. The apparatus of claim 9 wherein said ejecting means operates after said tape cartridge is raised from said second position to said first position.

11. The apparatus of claim 9 wherein said ejecting means comprises a cam coupled with said camming means, and an ejection arm coupled with said cam and extending adjacent to said loading rack and in general alignment with a tape cartridge receivable within said loading rack.

12. The apparatus of claim 4 wherein said articulated linkage includes first and second links respectively and pivotally connecting opposing ends of said loading rack to fixed portions of said apparatus, and a third link pivotally connecting centrally disposed portions of said first and second links for regulating the movement of said loading rack.

13. The apparatus of claim 12 wherein said links are cooperatively interconnected to impart an angle to said loading rack as said loading rack is raised from said second position to said first position.

14. The apparatus of claim 13 wherein said links are cooperatively interconnected to impart an angle to said loading rack as said loading rack is lowered from said first position to said second position.

15. The apparatus of claim 13 wherein an elongated slot connects an end of said loading rack with said articulated linkage to develop said imparted angle.

16. The apparatus of claim 4 wherein said camming means includes a motor for operating a cam positioned to engage portions of said articulated linkage.

17. The apparatus of claim 16 wherein said camming means includes a cam having two distinct profiles for moving said loading rack from said second position to said first position.

18. The apparatus of claim 17 wherein a first of said profiles is configured to gradually move said loading rack over a long duration.

19. The apparatus of claim 18 wherein said first profile operates to separate said supply reel from said supply motor as said loading rack is moved from said second position to said first position.

20. The apparatus of claim 18 wherein a second of said profiles is configured to rapidly move said loading rack over a short duration.

21. A transport apparatus comprising:
   a loading rack for receiving a tape cartridge containing a web of tape on a supply reel and including a leader block for engaging a free end of said web of tape;
   a supply motor for engaging and rotating said supply reel;
   a take-up reel for receiving said leader block and said web of tape, for transport between said supply reel and said take-up reel;
   a take-up motor for rotating said take-up reel;
   leader block loading means for transferring said leader block from said tape cartridge to said take-up reel and for returning said leader block to said tape cartridge;
   a head and guide assembly including a magnetic read/write head and a plurality of guide means for receiving said web of tape and for directing said web of tape across said head; and
   air supply means for providing compressed air to said guide means;
   wherein said leader block loading means comprises:
   a drive motor having a shaft receiving a drive coupling,
   a first arm pivoted for rotation about the shaft of said motor and coupled with said drive coupling, and
   a second arm pivoted for rotation upon said transport apparatus and coupled with said drive coupling and said first arm; and
   said loading rack, said supply motor, said take-up reel, said take-up motor, said leader block loading means, said head and guide assembly and said air supply means are confined within an 8 inch form factor.

22. The apparatus of claim 21 wherein said take-up reel includes a nest for receiving said leader block, and means for redirecting said leader block from an orientation defined by said leader block loading means to an orientation for entering the nest of said take-up reel.

23. The apparatus of claim 22 wherein said nest is generally radially oriented in said take-up reel and wherein said redirecting means rotates said leader block from an orientation generally transverse to said take-up reel to a generally radial orientation.

24. The apparatus of claim 22 wherein said redirecting means comprises a pair of spaced tracks formed in opposing flanges of said take-up reel.

25. The apparatus of claim 24 wherein said spaced tracks are curved bearing surfaces for receiving lateral portions of said leader block.

26. The apparatus of claim 16 wherein said first arm includes at a first end a bearing for slidingly receiving the shaft of said drive motor and a flange surrounding said bearing and having at least one slot for receiving a driving pin extending from said drive coupling, and at a second end a guide pin for engaging said leader block.

27. The apparatus of claim 36 wherein said second arm includes at a first end a slot for receiving a driving pin extending from said drive coupling and at a second end a drive pin extending from said second arm and into engagement with a slot formed in said first arm.

28. The apparatus of claim 27 wherein the slot in said first arm extends laterally from the second end of said first arm to the exterior of said first arm, to permit the drive pin extending from said second arm to separate from the slot formed in said first arm.

29. The apparatus of claim 28 wherein clutch means extend between said first arm and the driving pin which engages said first arm, for permitting pivotal movement of said driving pin and coupling greater than pivotal movement of said first arm.

30. The apparatus of claim 29 wherein said clutch means operates to maintain relative positioning between said first arm and said second arm in the course of operating said leader block loading means.

31. The apparatus of claim 29 wherein said clutch means is a spring-pin clutch.

32. The apparatus of claim 31 wherein said spring-pin clutch includes a spring which operates to facilitate removal of said leader block from said take-up reel.

33. The apparatus of claim 21 wherein said leader block is normally seated within said tape cartridge and wherein said drive motor and said first arm develop sufficient driving torque to convey an unseated leader block from said tape cartridge to said take-up reel and insufficient driving torque to seat and unseat said leader block in said tape cartridge.

34. The apparatus of claim 33 wherein said second arm is pivoted upon said transport apparatus to develop a lever between said drive coupling and said first arm to increase the driving torque of said first arm.

35. The apparatus of claim 34 wherein said lever develops sufficient driving torque to seat and unseat said leader block in said tape cartridge.

36. The apparatus of claim 35 wherein said leader block loading means defines a leader block transfer path and wherein in a first portion of said transfer path said first arm and said second arm are coupled to seat and unseat said leader block in said tape cartridge, and in a second portion of said transfer path said first arm is decoupled from said second arm to transfer said leader block from said tape cartridge to said take-up reel and to return said leader block to said tape cartridge.

37. The apparatus of claim 27 wherein said transfer path includes a third portion in which said leader block is received in said take-up reel, and including means for unseating said leader block from said take-up reel when said leader block is returned to said tape cartridge.

38. The apparatus of claim 34 wherein said unseating means includes a spring coupled with said first arm.

39. The apparatus of claim 27 wherein the first portion of said transfer path extends approximately 15 degrees of rotation from the seated position of said leader block in said tape cartridge.

40. The apparatus of claim 28 wherein the second portion of said transfer path extends from the first portion of said transfer path to said take-up reel.

41. The apparatus of claim 28 wherein said drive coupling is rotated through an angle which exceeds the angle through which said first arm is rotated during said first portion of the transfer path.

42. The apparatus of claim 29 wherein said drive coupling includes a driving pin extending from said drive coupling to engage said first arm, and a slot formed in said first arm for receiving said driving pin.

43. The apparatus of claim 30 wherein said slot is sized to permit said rotation of the drive coupling relative to the first arm during said first portion of the transfer path.

44. The apparatus of claim 31 wherein said driving pin engages an end of said slot during said second portion of the transfer path, to rotate said first arm responsive to rotation of said drive coupling.

45. The apparatus of claim 21 wherein said first arm includes at a first end a bearing for slidingly engaging said drive coupling and a slot for receiving a driving pin extending from said drive coupling, and at a second end a guide pin for engaging said leader block.

46. The apparatus of claim 45 wherein said second arm includes at a first end a follower for engaging a track formed in said drive coupling and at a second end a drive pin extending from said second arm and into engagement with a slot formed in said first arm.

47. The apparatus of claim 46 wherein said drive motor is supported directly beneath said first arm.

48. The apparatus of claim 46 wherein the slot in said first arm extends laterally from the second end of said first arm to the exterior of said first arm, to permit the drive pin extending from said second arm to separate from the slot formed in said first arm.

49. The apparatus of claim 48 wherein the track of said drive coupling includes a configured portion for directing the first end of said second arm so that said second arm is caused to rotate about said pivot.

50. The apparatus of claim 49 wherein the track of said drive coupling includes a constant radius portion adjacent to said configured portion, for maintaining the relative positioning between said first arm and said second arm while said first arm is rotated responsive to the driving pin of said drive coupling.

51. The apparatus of claim 49 wherein the track of said drive coupling includes a dwell portion adjacent to said configured portion, for receiving the follower of said second arm as said leader block becomes seated within said tape cartridge.

52. The apparatus of claim 51 wherein said dwell portion is sized so that said drive coupling and said driving pin can continue to rotate after said leader block is seated within said tape cartridge.

53. The apparatus of claim 52 wherein said dwell portion is generally radially oriented in said drive coupling.

54. The apparatus of claim 52 wherein said track includes gating means in said configured portion for passing said follower into said dwell portion when said leader block becomes seated in said tape cartridge before said follower is positioned to leave the configured portion of said track.

55. The apparatus of claim 52 wherein said apparatus includes means for discontinuing further driven rotation of said drive coupling and driving pin as said follower enters the dwell portion of said track.

56. The apparatus of claim 55 wherein power to said drive motor is discontinued as said leader block is seated within said tape cartridge.

57. The apparatus of claim 56 wherein said power is discontinued by switching means extending from said drive coupling and into alignment with a switch for discontinuing said power to said drive motor.

58. The apparatus of claim 48 wherein said first arm includes a first spring extending over said slot and positioned for engagement by said driving pin, to rotate said first arm responsive to movement of said driving pin responsive to rotation of said drive coupling.

59. The apparatus of claim 58 wherein said first arm includes a second spring extending over said slot and positioned for engagement by said driving pin, to rotate said first arm responsive to movement of said driving pin responsive to rotation of said drive coupling.

60. The apparatus of claim 59 wherein said second spring operates to facilitate removal of said leader block from said take-up reel.

61. The apparatus of claim 58 wherein said slot is elongated so that said drive coupling and said driving pin can continue to rotate after said leader block is received within said take-up reel, against said first spring.

62. The apparatus of claim 61 wherein said first spring is positioned to resist said continued rotation of the drive coupling and driving pin, and to return said drive coupling and driving pin to a neutral position which substantially corresponds to receipt of said leader block within said take-up reel.

63. The apparatus of claim 62 wherein said spring is a double-action spring having two different spring rates for acting upon said driving pin.

64. The apparatus of claim 62 wherein said apparatus includes means for discontinuing further driven rotation of said drive coupling and driving pin as said leader block enters said take-up reel.

65. The apparatus of claim 64 wherein power to said drive motor is discontinued as said leader block is received within said take-up reel.

66. The apparatus of claim 65 wherein said power is discontinued when said first spring is resisting said continued rotation of the drive coupling and driving pin.

67. The apparatus of claim 65 wherein said power is discontinued by switching means extending from said first arm and into alignment with a switch for discontinuing said power to said drive motor.

68. The apparatus of claim 65 wherein said power is reduced just before said leader block is received within said take-up reel.

69. A transport apparatus comprising:

a loading rack for receiving a tape cartridge containing a web of tape on a supply reel and including a leader block for engaging a free end of said web of tape;

a supply motor for engaging and rotating said supply reel;

a take-up reel for receiving said leader block and said web of tape, for transport between said supply reel and said take-up reel;

a take-up motor for rotating said take-up reel;

leader block loading means for transferring said leader block from said tape cartridge to said take-up reel and for returning said leader block to said tape cartridge;

a head and guide assembly including a magnetic read/write head and a plurality of guide means for receiving said web of tape and for directing said web of tape across said head; and air supply means for providing compressed air to said guide means;

wherein said take-up reel comprises a hub for receiving said web of tape, and includes a nest for receiving said leader block, a pair of flanges attached to opposing ends of said hub, and means for consistently packing said web of tape upon said hub; and said loading rack, said supply motor, said take-up reel, said take-up motor, said leader block loading means, said head and guide assembly and said air supply means are confined within an 8 inch form factor.

70. The apparatus of claim 69 wherein said packing means includes means for maintaining said hub in a generally cylindrical configuration irrespective of packing of said web of tape upon said hub.

71. The apparatus of claim 70 wherein said packing means includes elastically deformable means for compressing said hub responsive to said tape packing.

72. The apparatus of claim 71 wherein said hub has a honey-comb configuration.

73. The apparatus of claim 72 wherein said honey-comb configuration includes a plurality of generally radially disposed ribs which terminate in a plurality of sectors extending to peripheral portions of said hub.

74. The apparatus of claim 69 wherein said packing means includes means for mating rear edges of a nested leader block with peripheral portions of said hub adjacent to said nest.

75. The apparatus of claim 74 wherein said mating means includes opposing arms cantilevered from the peripheral portions of said hub for engaging rear edge portions of said nested leader block.

76. The apparatus of claim 75 wherein said cantilevered arms are formed of a resilient, elastically deformable material.

77. The apparatus of claim 76 wherein said cantilevered arms are closed down upon said leader block as said web of tape is received upon the hub of said take-up reel.

78. The apparatus of claim 77 wherein said cantilevered arms are closed down upon said leader block to an extent which varies responsive to packing of said web of tape upon the hub of said take-up reel, to match the peripheral portions of said hub with the rear edges of said nested leader block.

79. The apparatus of claim 76 wherein said cantilevered arms vary in resiliency along their length.

80. The apparatus of claim 79 wherein said cantilevered arms progressively decrease in resiliency from said hub to the nest for said leader block.

81. The apparatus of claim 79 wherein said cantilevered arms progressively decrease in thickness from said hub to the nest for said leader block.

82. A transport apparatus comprising:
a loading rack for receiving a tape cartridge containing a web of tape on a supply reel and including a leader block for engaging a free end of said web of tape;
a supply motor for engaging and rotating said supply reel;
a take-up reel for receiving said leader block and said web of tape, for transport between said supply reel and said take-up reel;
a take-up motor for rotating said take-up reel;
leader block loading means for transferring said leader block from said tape cartridge to said take-up reel and for returning said leader block to said tape cartridge;
a head and guide assembly including a magnetic read/write head and a plurality of guide means for receiving said web of tape and for directing said web of tape across said head; and
air supply means for providing compressed air to said guide means;
wherein said head and guide assembly defines the tape path between said supply reel and said take-up reel;
said head and guide assembly includes a head and a plurality of guides positioned on either side of said head, each mounted to a common plate; and
said loading rack, said supply motor, said take-up reel, said take-up motor, said leader block loading means, said head and guide assembly and said air supply means are confined within an 8 inch form factor.

83. The apparatus of claim 82 wherein said head and guide assembly receives a parallel, 18 track magnetic read/write head.

84. The apparatus of claim 82 wherein said head is received by an adjustable mounted plate.

85. The apparatus of claim 82 wherein said head and guide assembly includes a knife edge tape cleaner located in a plane spaced from the tape path established for the web of tape, and wherein a vacuum is applied to the web of tape to draw the web of tape onto the knife edge tape cleaner.

86. The apparatus of claim 85 wherein said vacuum operates to draw the web of tape onto the knife edge tape cleaner virtually without tape wrap at knife edge portions of the tape cleaner.

87. The apparatus of claim 86 wherein said vacuum operates to draw the web of tape onto the knife edge tape cleaner with about 1 degree of tape wrap across said knife edge portions.

88. The apparatus of claim 82 wherein said plate defines a reference surface for said web of tape, and wherein said reference surface is provided with a wear-resistant surface.

89. The apparatus of claim 88 wherein said wear-resistant surface is a coating formed of a nitride of titanium or silicon.

90. The apparatus of claim 88 wherein said wear-resistant surface is an insert formed of an oxide of aluminum.

91. The apparatus of claim 90 wherein said oxide of aluminum is a monocrystalline or polycrystalline alumina.

92. The apparatus of claim 82 wherein said head and guide assembly includes a knife edge tape cleaner located between an adjacent pair of guides.

93. The apparatus of claim 92 wherein said knife edge tape cleaner is located between said head and said supply reel.

94. The apparatus of claim 92 wherein said knife edge tape cleaner is located between said head and said take-up reel.

95. The apparatus of claim 92 wherein said knife edge tape cleaner includes a pair of blades positioned to operate on said web of tape irrespective of transport direction.

96. The apparatus of claim 82 wherein said guides are air bearings.

97. The apparatus of claim 96 wherein one of said guides includes tension sensing means for regulating transport of said tape.

98. The apparatus of claim 96 wherein one of said guides includes a knife edge tape cleaner.

99. The apparatus of claim 96 wherein guides on opposite sides of said head include tension sensing means for regulating transport of said tape.

100. The apparatus of claim 99 wherein said tension sensing means are interconnected to obtain an average tension of the web of the tape across said head.

101. The apparatus of claim 99 wherein said tension sensing means are interconnected to detect sticking of said web of tape to said head.

102. The apparatus of claim 82 wherein at least some of said guides include springs for urging said web of tape against a reference surface.

103. The apparatus of claim 102 wherein said guide springs are provided with wear-resistant surfaces for contacting said web of tape.

104. The apparatus of claim 103 wherein said wear-resistant surfaces are coated with a nitride of titanium or silicon.

105. The apparatus of claim 103 wherein said wear-resistant surfaces are pads formed of an oxide of aluminum.

106. The apparatus of claim 105 wherein said oxide of aluminum is a monocrystalline or polycrystalline alumina.

107. The apparatus of claim 102 wherein said guide springs are positioned to contact a web of tape which departs from said reference surface, to direct said web of tape toward said reference surface.

108. The apparatus of claim 107 wherein said guide springs are positioned to contact only portions of the web of tape which depart from said reference surface.

109. The apparatus of claim 108 wherein ends of said guide springs nearest to said supply reel and said take-up reel diverge from one another in the general direction of the supply reel and the take-up reel.

110. The apparatus of claim 109 wherein said diverging is substantially linear.

111. The apparatus of claim 108 wherein ends of said guide springs nearest to said supply reel and said take-up reel are compliant, with a variable spring rate which increases in the general direction of the supply reel and the take-up reel.

112. The apparatus of claim 111 wherein said increase is substantially linear.

113. The apparatus of claim 111 wherein features of said guide springs have a varying thickness to provide said variable spring rate.

114. The apparatus of claim 108 wherein portions of said guide springs are compliant, with a variable spring rate which is increased in areas for guiding said web of tape.

115. The apparatus of claim 114 wherein said variable spring rate is decreased toward ends of said guide springs nearest to said supply reel and said take-up reel.

116. The apparatus of claim 114 wherein features of said guide springs have a varying thickness to provide said variable spring rate.

117. A transport apparatus comprising:
- a loading rack for receiving a tape cartridge containing a web of tape on a supply reel and including a leader block for engaging a free end of said web of tape;
- a supply motor for engaging and rotating said supply reel;
- a take-up reel for receiving said leader block and said web of tape, for transport between said supply reel and said take-up reel;
- a take-up motor for rotating said take-up reel;
- leader block loading means for transferring said leader block from said tape cartridge to said take-up reel and for returning said leader block to said tape cartridge;
- a head and guide assembly including a magnetic read/write head and a plurality of guides for receiving said web of tape and for directing said web of tape across said head; and
- air supply means for providing compressed air to said guides;
- wherein said guides are comprised of a hollow body having a curved open end, and a foil attached over the open end of the hollow body; and
- said loading rack, said supply motor, said take-up reel, said take-up motor, said leader block loading means, said head and guide assembly and said air supply means are confined within an 8 inch form factor.

118. The apparatus of claim 117 wherein the foil attached over the open end of said hollow body is produced from a substrate which is first formed to correspond to the curvature of the open end of said hollow body, and then etched to develop the foil which covers the open end of said hollow body.

119. The apparatus of claim 117 wherein said foil includes grounding means for developing a low impedance path to a grounded surface.

120. The apparatus of claim 119 wherein said grounding means is a tab extending from said foil for connection to said plate.

121. The apparatus of claim 119 wherein said grounding means is a tab extending from said foil for engaging a guide spring associated with said guides.

122. A transport apparatus comprising:
- a loading rack for receiving a tape cartridge containing a web of tape on a supply reel and including a leader block for engaging a free end of said web of tape;
- a supply motor for engaging and rotating said supply reel;
- a take-up reel for receiving said leader block and said web of tape, for transport between said supply reel and said take-up reel;
- a take-up motor for rotating said take-up reel;
- leader block loading means for transferring said leader block from said tape cartridge to said take-up reel and for returning said leader block to said tape cartridge;
- a head and guide assembly including a magnetic read/write head and a plurality of guide means for receiving said web of tape and for directing said web of tape across said head; and
- air supply means for providing compressed air to said guide means;
- wherein said air supply means includes a compressor for providing compressed air to said guide means;
- air for said compressor is withdrawn from a knife edge tape cleaner associated with said head and guide assembly, providing vacuum for use in connection with said knife edge tape cleaner; and
- said loading rack, said supply motor, said take-up reel, said take-up motor, said leader block loading means, said head and guide assembly and said air supply means are confined with in an 8 inch form factor.

123. A transport apparatus comprising:
- a loading rack for receiving a tape cartridge containing a web of tape on a supply reel and including a leader block for engaging a free end of said web of tape;
- a supply motor for engaging said rotating said supply reel;
- a take-up reel for receiving said leader block and said web of tape, for transport between said supply reel and said take-up reel;
- a take-up motor for rotating said take-up reel;
- leader block loading means for transferring said leader block from said tape cartridge to said take-up reel and for returning said leader block to said tape cartridge;
- a head and guide assembly including a magnetic read/write head and a plurality of guide means for receiving said web of tape and for directing said web of tape across said head; and
- air supply means for providing compressed air to said guide means;
- wherein said air supply means includes a compressor for providing compressed air to said guide means;
- said guide means are air bearings, and said air supply means includes means for delivering said compressed air to said air bearings when said web of tape is in transport, and to said air bearings and an air jet in said head when said web of tape is stationary; and
- said loading rack, said supply motor, said take-up reel, said take-up motor, said leader block leading means, said head and guide assembly and said air supply means are confined within an 8 inch form factor.

124. The apparatus of claim 123 wherein said compressor is sufficient to provide compressed air to said air bearings when said web of tape is in transport, but insufficient to provide compressed air to said air bearings and said air jet when said web of tape is stationary.

125. The apparatus of claim 124 wherein said air supply means includes means for reducing the tension in said web of tape when said web of tape is stationary to enable said compressor to provide sufficient compressed air to said air bearings and said air jet.

126. The apparatus of claim 123 wherein said air supply means includes valve means for diverting compressed air to and between said air bearings and said air jet.

127. The apparatus of claim 126 wherein said compressed air is supplied to a plenum after passing through a heat exchanger and a filter in series combination, and said valve means receives compressed air from said plenum.

128. The apparatus of claim 127 wherein said plenum additionally communicates with said air bearings, separately from said valve means.

129. The apparatus of claim 127 wherein said compressor includes means for regulating the supply of compressed air to said valve means according to pressures sensed in said plenum.

130. The apparatus of claim 129 wherein said regulating means also includes means for varying the supply of compressed air to said valve means according to pressures required at said air guides.

131. The apparatus of claim 130 wherein said regulating means is responsive to tape packing on said supply reel and said take-up reel.

132. A transport apparatus comprising:
a loading rack for receiving a tape cartridge containing a web of tape on a supply reel and including a leader block for engaging a free end of said web of tape;
a supply motor for engaging and rotating said supply reel;
a take-up reel for receiving said leader block and said web of tape, for transport between said supply reel and said take-up reel;
a take-up motor for rotating said take-up reel;
leader block loading means for transferring said leader block from said tape cartridge to said take-up reel and for returning said leader block to said tape cartridge;
a head and guide assembly including a magnetic read/write head and a plurality of guide means for receiving said web of tape and for directing said web of tape across said head; and
air supply means for providing compressed air to said guide means;
wherein said transport apparatus is housed in a container including a slot for receiving said tape cartridge and positioned for communication with said loading rack, and a control panel for operating said transport apparatus;
said control panel is removably connected to said container to assume a plurality of different orientations relative to said container; and
said loading rack, said supply motor, said take-up reel, said take-up motor, said leader block loading means, said head and guide assembly and said air supply means are confined within an 8 inch form factor.

133. The apparatus of claim 132 wherein said control panel is horizontally orientable in said container when said container is either horizontally or vertically oriented.

134. The apparatus of claim 132 wherein said control panel is operable when remote from said container.

135. The apparatus of claim 132 wherein said control panel comprises a frame for receiving control means for operating said apparatus and a plurality of brackets for removable engagement with said container and extending from said frame.

136. The apparatus of claim 135 wherein said frame also includes brackets for engaging said control means and for retaining said control means in close proximity to said frame.

137. The apparatus of claim 135 wherein said frame further includes means for receiving a removable indicia bearing template for orientation to said container.

138. The apparatus of claim 135 wherein said brackets have angled prongs for engaging said container.

139. The apparatus of claim 138 wherein said prongs are positioned at a 45 degree angle relative to side edges of said frame.

* * * * *